(12) United States Patent
Takahashi et al.

(10) Patent No.: US 12,176,652 B2
(45) Date of Patent: Dec. 24, 2024

(54) CONNECTOR DEVICE

(71) Applicant: JAPAN AVIATION ELECTRONICS INDUSTRY, LIMITED, Tokyo (JP)

(72) Inventors: Takeshi Takahashi, Tokyo (JP); Ryota Mizutani, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 356 days.

(21) Appl. No.: 17/890,530

(22) Filed: Aug. 18, 2022

(65) Prior Publication Data

US 2023/0062271 A1 Mar. 2, 2023

(30) Foreign Application Priority Data

Aug. 30, 2021 (JP) ................................ 2021-139913

(51) Int. Cl.
*H01R 13/62* (2006.01)
*H01R 13/629* (2006.01)
*B60R 16/02* (2006.01)

(52) U.S. Cl.
CPC ........ *H01R 13/62927* (2013.01); *B60R 16/02* (2013.01); *H01R 2201/26* (2013.01)

(58) Field of Classification Search
CPC ................................................. H01R 13/6295
See application file for complete search history.

(56) References Cited

U.S. PATENT DOCUMENTS

| | | | |
|---|---|---|---|
| 6,558,176 B1 * | 5/2003 | Martin | H01R 13/62944 439/372 |
| 6,619,970 B2 | 9/2003 | Fukushima et al. | |
| 6,619,978 B2 * | 9/2003 | Okabe | H01R 13/62933 439/372 |
| 6,982,393 B2 * | 1/2006 | Matsui | H01R 13/62933 200/332 |

(Continued)

FOREIGN PATENT DOCUMENTS

| | | |
|---|---|---|
| JP | 2003-100382 A | 4/2003 |
| WO | 2014/041096 | 3/2014 |

OTHER PUBLICATIONS

Office Action issued in Corresponding KR Patent Application No. 10-2022-0098572, dated Mar. 13, 2024, along with an English translation thereof.

(Continued)

*Primary Examiner* — Neil Abrams
(74) *Attorney, Agent, or Firm* — Greenblum & Bernstein, P.L.C.

(57) ABSTRACT

A lever of a connector can rotate between a first position and a second position and can slide between the second position and a third position. When the lever is rotated to the second position in a state in which the connector whose lever is on the first position is on a fitting preparation position with respect to a mating connector, the connector is drawn to a fitting position, which is closer to the mating connector, by a cam mechanism and a main terminal of the connector and a mating main terminal of the mating connector are con- (Continued)

nected with each other. When the lever is slid to the third position, a flange portion provided to a housing of the connector and a mating flange portion provided to a mating housing of the mating connector are accommodated in a groove portion of the lever.

12 Claims, 67 Drawing Sheets

(56) References Cited

U.S. PATENT DOCUMENTS

| | | | |
|---|---|---|---|
| 8,033,844 B2* | 10/2011 | Kobayashi | H01R 13/62955 |
| | | | 439/157 |
| 9,130,324 B2* | 9/2015 | Furuya | H01R 24/005 |
| 10,044,138 B2 | 8/2018 | Chikusa et al. | |
| 2019/0393649 A1 | 12/2019 | Yamane et al. | |
| 2023/0062271 A1* | 3/2023 | Takahashi | H01R 13/62927 |

OTHER PUBLICATIONS

U.S. Appl. No. 17/828,101 to Ryota Mizutani, filed May 31, 2022.
Extended European Search Report Issued in Corresponding EP Patent Application No. 22191839.4, dated Jan. 30, 2023.

* cited by examiner

CONNECTOR DEVICE

TECHNICAL FIELD

The present invention relates to a connector device in which fitting and separation between a connector and a mating connector are performed through a rotation operation and sliding operation of a lever.

BACKGROUND ART

FIG. 1 illustrates the configuration described in Japanese Patent Application Laid Open No. 2003-100382 as a conventional example of this kind of connector device, in which one connector housing 11 is mounted on the other connector housing 21 by operating a lever 12 attached to the one connector housing 11.

A terminal hood portion 11a is provided on the lower portion of the connector housing 11, and a pair of terminals (male terminals) 13 is provided in the terminal hood portion 11a. On the outer wall of the connector housing 11, a pair of guide pins 11b is provided in a protruding manner. The guide pins 11b are engaged with respective guide grooves 14 of the lever 12 which will be described later.

As illustrated in FIGS. 2A and 2B, the lever 12 includes a pair of arm plate portions 12a and 12h and an operation portion 12c that couples the arm plate portions 12a and 12b provided in a pair. The guide grooves 14 that horizontally extend are formed on the respective arm plate portions 12a and 12b provided in a pair. The guide pins 11b, which are provided in a pair, of the connector housing 11 are inserted into the respective guide grooves 14. Thus, the lever 12 is provided in a manner to be able to rotationally and linearly move with respect to the connector housing 11.

On the arm plate portions 12a and 12b provided in a pair, respective cam grooves 15 are formed in a pair. To the cam grooves 15, respective cam pins 21a, described later, of the other connector housing 21 are inserted when the one connector housing 11 is mounted on the other connector housing 21.

In this example, the arm plate portion 12b is formed wider than the arm plate portion 12a. The arm plate portion 12b having the wider width is provided with a connector portion 12d and the connector portion 12d is provided with a fitting detection male terminal 16.

The other connector housing 21 has a substantially rectangular parallelepiped shape whose top surface is opened and whose inner space serves as a mounting space 21b of the connector housing 11. A terminal hood accommodating portion 21c is provided on a bottom surface portion, which is the bottom surface of the mounting space 21b, and a pair of terminals (female terminals) 22 is accommodated in the terminal hood accommodating portion 21c.

The respective cam pins 21a are provided in a pair in a protruding manner on symmetrical positions on an inner circumferential wall of the connector housing 2:1, and a connector portion 21d is further provided in the mounting space 21b. The connector portion 21d is provided with a pair of fitting detection female terminals 23 (see FIGS. 4A and 4B described later).

FIGS. 3A to 3C illustrate states of the lever 12 together with the cam pin 21a of the other connector housing 21 in a process of mounting the one connector housing 11 on the other connector housing 21 by inserting the one connector housing 11 into the mounting space 21b of the other connector housing 21 from a state before the one connector housing 11 is mounted on the other connector housing 21, illustrated in FIG. 1. FIG. 3A illustrates a state in which the lever 12 is rotated from a rotation starting position illustrated in FIG. 1 to an arrow a direction to be positioned between the rotation starting position and a rotation completion position. FIG. 3B illustrates a state in which the lever 12 is on the rotation completion position. Further. FIG. 3C illustrates a state in which the lever 12 is slid to an arrow b direction and is on a fitting completion position.

The cam pins 21a of the other connector housing 21 that are inserted into the cam grooves 15 of the lever 12 move along the cam grooves 15 along with the rotation of the lever 12. Accordingly, the one connector housing 11 gradually approaches and moves into the other connector housing 21 and this approach brings the terminals 13 and 22 of both connector housings 11 and 21 into contact with each other by the time when the lever 12 comes to be positioned on the rotation completion position.

Then, when the lever 12 is slidingly moved in the arrow h direction from the rotation completion position to the fitting completion position, the fining detection male terminal 16 of the lever 12 comes into contact with the pair of fitting detection female terminals 23 of the other connector housing 21 by the time when the lever 12 comes to be positioned on the fitting completion position. FIGS. 4A and 4B illustrate a state in which the lever 12 is positioned on the fitting completion position and the mounting of the one connector housing 11 onto the other connector housing 21 is completed.

The operation of the lever 12 is thus composed of two actions which are the rotation operation and the sliding operation. By the sliding operation after the rotation operation, the fitting detection male terminal 16 comes into contact with the fitting detection female terminals 23 and the fitting is detected. This detection of the fitting allows a power source circuit to be in a conductive state and supply current between the terminals 13 and 22.

The operation of the lever 12 for shifting the power source circuit from the conductive state to a non-conductive state is composed of reverse two actions, where the power source circuit is turned off by the sliding operation performed first and the terminals 13 and the terminals 22 separate from each other through the rotation operation subsequently performed.

The connector device operating as described above can prevent a power source circuit from becoming into a conductive state before the operation of a lever thereof is completed and can prevent an occurrence of arc discharge. Thus, the connector device is designed in consideration of safety as a connector device for high voltage and large current.

Such a connector device fOr high voltage and large current is used for, for example, connection between a battery and a cable harness in an electric vehicle and the like and is designed for securing safety of an operator in maintenance of an electrical system and the like.

However, in-vehicle application of such a connector device may generate a problem in that components of a connector and a mating connector rub against each other when the connector and the mating connector relatively move due to vibration, which causes degradation in quality and connection performance.

BRIEF SUMMARY OF THE INVENTION

An object of the present invention is to provide a connector device whose quality and connection performance can be prevented from degrading even when the connector device is used in a vibration environment.

The technical matters described herein are not intended to expressly or implicitly limit the invention described in the claims, or, moreover, are not a statement of the possibility of accepting such limitation imposed by persons other than those who benefit from the present invention (for example, the applicant and the right holder), but are merely described to facilitate an understanding of the gist of the present invention. An overview of the present invention from another point of view can be understood, for example, from the scope of claims at the time of filing this patent application.

A connector device according to the present invention includes a first connector and a second connector.

The first connector includes a housing and a lever. The housing of the first connector includes a first lug (also referred to as a "flange portion" in this specification). The first lug has a flat surface.

The lever of the first connector has a groove.

The second connector includes a housing. The housing of the second connector includes a second lug (also referred to as a "mating flange portion" in this specification). The second lug has a flat surface.

The first connector is fitted to the second connector through a rotation operation of the lever from a first position to a second position. In this fitted state, the flat surface of the first lug and the flat surface of the second lug are in close contact with each other.

Through a sliding operation of the lever from the second position to a third position, the first lug and the second lug are housed in the groove of the lever in a manner in which the first lug and the second lug are in close contact with each other. Backlash between the set of first and second lugs, being in close contact with each other, and the groove of the lever is preferably as small as possible in a direction in which the first connector is fitted to the second connector.

This configuration can prevent relative movement between the first connector and the second connector, especially relative movement between the first connector and the second connector in a direction in which the first connector is fitted to the second connector.

Preferably, the connector device may include, but not limited to, a locking mechanism for blocking the sliding operation of the lever. The set of first and second lugs which are in close contact with each other is securely held in the groove of the lever because the locking mechanism blocks the sliding operation of the lever.

Preferably, the configuration, but not limited to such configuration, is also permitted that the lever has a pair of arms, where one arm has two different groove portions on respective portions in a longitudinal direction of the one arm, the other arm has two different groove portions on respective portions in a longitudinal direction of the other arm, and these four groove portions house respective four sets of the first and second lugs that are each in close contact with each other. This configuration can stably and robustly prevent relative movement between the first connector and the second connector.

The "housing" is not limited to an object that is narrowly interpreted according to its dictionary definition. That is, "housing" is not limited to an object that has only a function based on the dictionary definition of the term (however, this object may be a single element or may be composed of two or more elements), or is not limited to a portion of a single object that has a function based on the dictionary definition of the term. A "housing" may be an object that has only a function based on the dictionary definition of the term, or it may be an object that has a function not based on the dictionary definition of the term, or it may be an object that has other functions in addition to the function based on the dictionary definition of the term, or it may be a single object that includes portions having the function based on the dictionary definition of the term and portions not having the function based on the dictionary definition of the term.

Effects of the Invention

According to the connector device of the present invention, relative movement (rattling) between a housing of a connector and a mating housing of a mating connector can be prevented. Thus, a connector device whose quality and connection performance do not degrade even when used in a vibration environment and that exhibits superior vibration resistance can be obtained.

LIST OF REFERENCE NUMERALS

Figure 1:
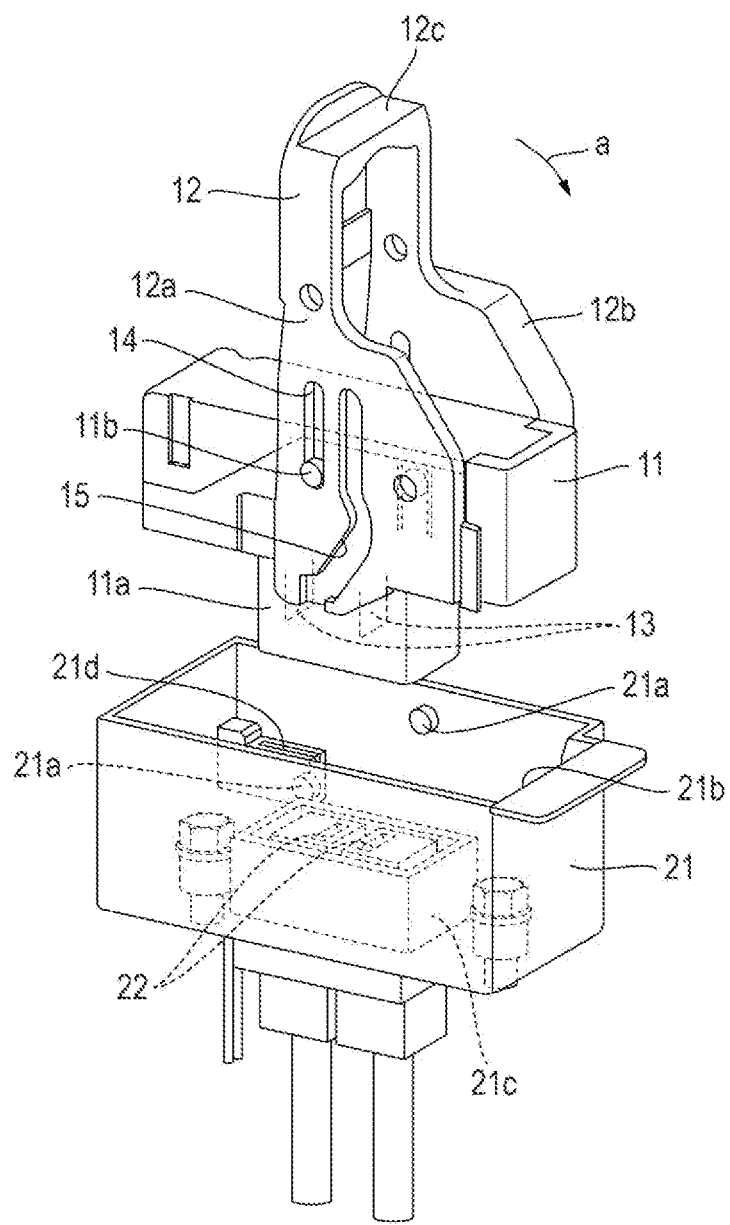
FIG. 1 is a perspective view illustrating a conventional example of a connector device.

11: connector housing
11a: terminal hood portion
11b: guide pin
12: lever
12a: arm plate portion
12b: arm plate portion
12c: operation portion
12d: connector portion
13: terminal
14: guide groove
15: cam groove
16: fitting detection male terminal
21: connector housing
21a: cam pin
21b: mounting space
21c: terminal hood accommodating portion
21d: connector portion
22: terminal
23: fitting detection female terminal
30: housing
31: fitting portion
32: cable accommodating portion
33: accommodating portion
34: accommodating portion
35: guide shaft
36: flange portion
37: flange portion
36a: projection
38: groove
38a: protrusion
39: attaching portion
39a: slit
39b: abutting surface 40: lever
41: arm portion
42: coupling portion
42a: opening
43: guide groove
44: cam groove
45: groove portion
46: groove portion
45a: projection
47: attaching portion
48: locking portion
49: operation portion
49a: reinforcing wall
49b: opening
49c: wall portion
49d: slide insertion portion
49e: cutout
49f: pressing portion
50: main terminal
60: interlock terminal
70: locking component
71: locking piece
80: cable cover
90: interlock housing
91: cylindrical portion
92: operation portion
93: spring piece
93a: protrusion portion
100: connector
110: mating housing
111: plate portion
112: opposite fitting portion
112a: circumferential all
113: driven boss
114: cutout
115: mating flange portion.
116: mating flange portion.
115a: projection
117: upright portion
118: upright portion
119: attaching portion
120: mating main terminal
130: mating interlock terminal
200: mating connector
300: cable
400: connector
500: mating connector

DETAILED DESCRIPTION

Embodiments of the present invention will be described based on examples with reference to the accompanying drawings.

First Embodiment

Figure 5A:
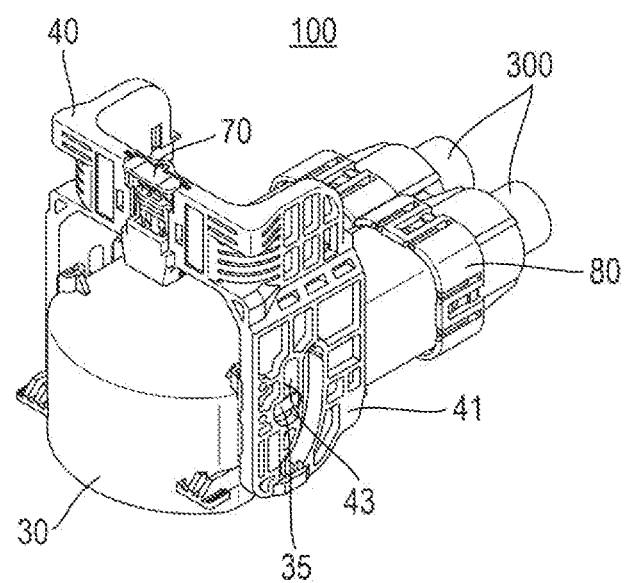
FIG. 5A is an upper perspective view illustrating a connector of a connector device according to a first embodiment of the present invention.
Figure 5B:
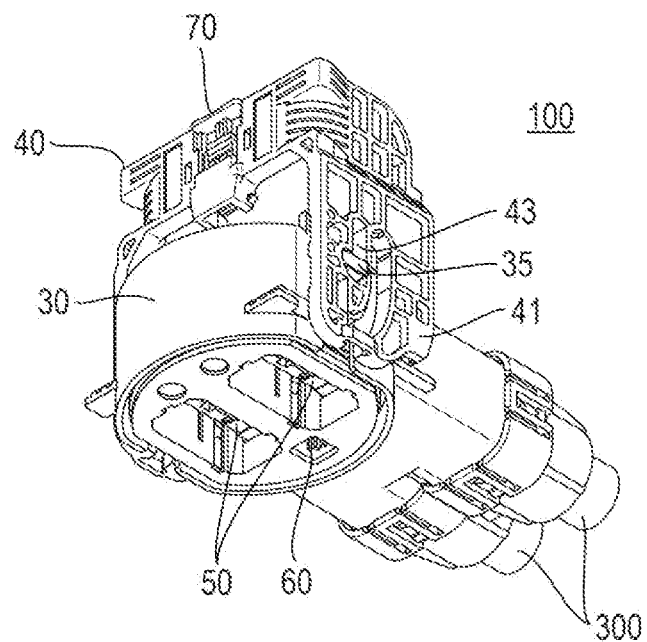
FIG. 5B is a lower perspective view of the connector illustrated in FIG. 5A.

FIGS. 5A and 5B and Ms. 6A to 6C respectively illustrate a connector 100 and a mating connector 200 that constitute a connector device according to a first embodiment of the present invention, and the connector device composed of the connector 100 and the mating connector 200 is a connector device for high voltage and large current, including high-voltage interlocks (HVILs) and being used in-vehicle.

In FIGS. 5A and 5B, 30 denotes a housing and 40 denotes a lever. 300 denotes a cable, and the connector 100 is attached to terminals of two cables 300 in this example. In the housing 30, main terminals 50 that are respectively connected with the two cables 300 are accommodated and an interlock terminal 60 is further accommodated. Further, a locking component 70 for connector position assurance (CPA) is attached to the lever 40. In FIG. 5A, 80 denotes a cable cover that is attached to the housing 30.

The configurations of the housing 30 and the lever 40 of the connector 100 will be first described.

The housing 30 is roughly composed of a fitting portion 31 and a cable accommodating portion 32 that adjoins the rear portion of the fitting portion 31, as illustrated in FIGS. 7A, 7B, 7C, and 7D. The fitting portion 31 has two accommodating portions 33 that are largely opened on bottom surfaces thereof, and the main terminals 50 are to be accommodated and disposed in respective accommodating portions 33. Another accommodating portion 34 that is opened on the bottom surface thereof is further provided in addition to the accommodating portions 33 and the interlock terminal 60 is to be accommodated and disposed in the accommodating portion 34.

Guide shafts 35 are formed in a pair substantially on the centers of both lateral surfaces in the front-rear direction of the fitting portion 31 in a manner to protrude mutually outward. Further, flange portions 36 are formed in a pair on front sides (opposite side to a side on which the cable accommodating portion 32 is positioned) of both lateral surfaces of the fitting portion 311 in a manner to protrude mutually outward. Furthermore, on both lateral surfaces of the housing 30, flange portions 37 are formed in a pair connecting both to the fitting portion 31 and to the cable accommodating portion 32 in a manner to protrude mutually outward. These four flange portions 36 and 37 are projections that are extended in the front-rear direction of the housing 30.

A groove 38 is formed on the upper surface of the housing 30. The groove 38 is extended from a rear end of the cable accommodating portion 32 to the fitting portion 31 in the front-rear direction. A protrusion 38a is formed in the groove 38 in a protruding manner on a front end portion of the groove 38.

As illustrated in FIGS. 8A, 8B, 8C, 8D, 8E, and 8F, the lever 40 is composed of a pair of arm portions 41 that have a plate shape and a coupling portion 42 that couples upper ends (in FIGS. 8C, 8D, 8E, and 8F) of the proximal sides of the pair of arm portions 41. On the respective arm portions 41, guide grooves 43 are formed and cam grooves 44 are further formed. The guide grooves 43 extend in the longitudinal direction of the arm portions 41. The cam groove 44 has a curved shape and the distal end of the cam groove 44 is positioned on the distal end of the arm portion 41, as illustrated in FIGS. 8A, 8B, 8C, 8D, 8E, and 8F.

Groove portions 45 are formed on respective inner surfaces of the distal ends of the arm portions 41, and groove portions 46 are further formed on the respective inner surfaces of their proximal portions. These four groove portions 45 and 46 have a substantially concave groove shape extending in the longitudinal direction of the arm portion 4:1. On the other hand, an attaching portion 47 for attaching the locking component 70 is formed on an upper surface (in FIGS. 8C and 8E) of the coupling portion 42 at the center of its longitudinal direction.

The locking component 70 is attached to the lever 40 having the above-described configuration. The lever 40, to which the locking component 70 is attached, is attached to the housing 30 in a manner such that the guide shafts 35, provided in a pair, of the housing 30 are inserted in and positioned on respective guide grooves 43 of the pair of arm portions 41 and the arm portions 41 sandwich the housing 30. The lever 40 can, in reference to the housing 30, rotate between a first position and a second position for the lever 40 to take and can slide between the second position and a third position for it also to take, as described later. FIGS. 5A and SB illustrate a state in which the lever 40 is on the first position.

Figure 6A:
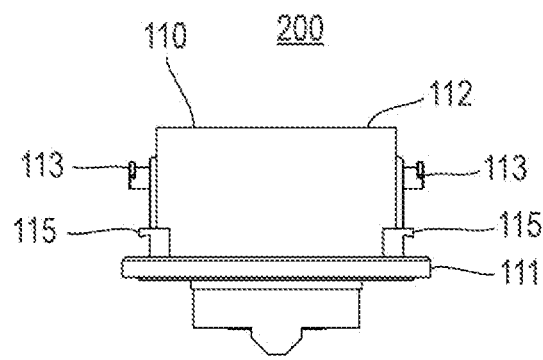
FIG. 6A is an elevational view illustrating a mating connector of the connector device according to the first embodiment of the present invention.
Figure 6B:
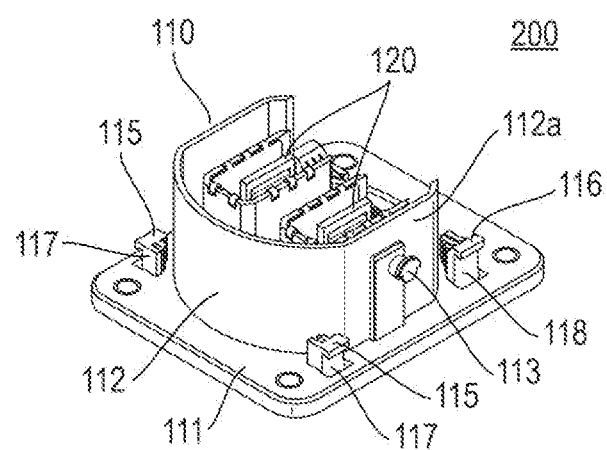
FIG. 6B is a front side perspective view of the mating connector illustrated in FIG. 6A.
Figure 6C:
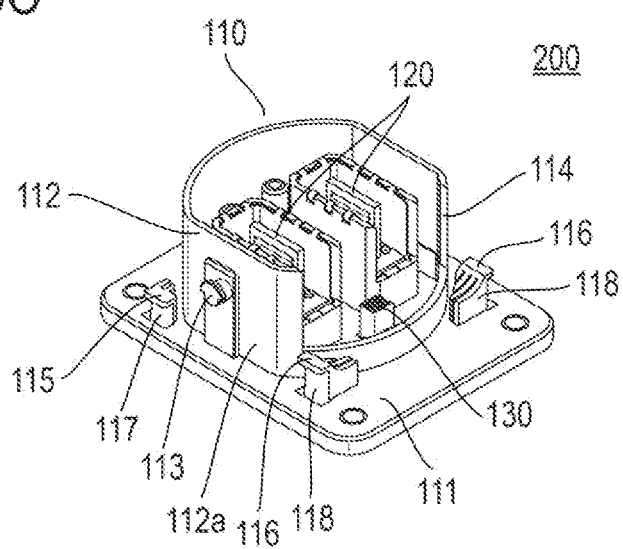
FIG. 6C is a rear side perspective view of the mating connector illustrated in FIG. 6A.
Figure 7A:
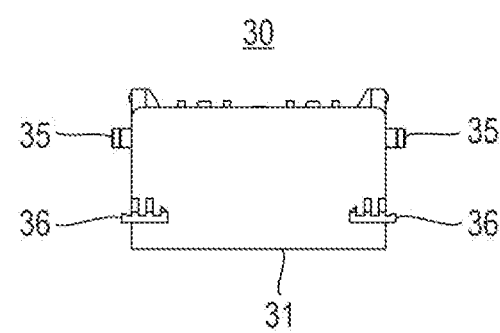
FIG. 7A is an elevational view of a housing of FIG. 5A.
Figure 7B:
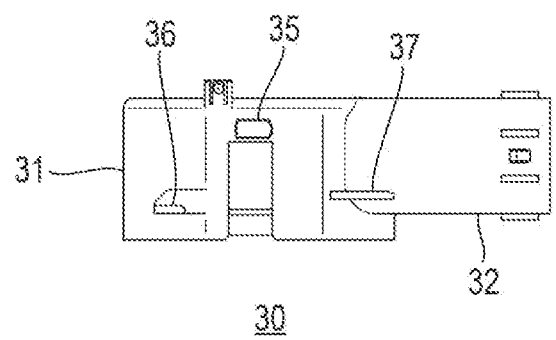
FIG. 7B is a right side view of the housing of FIG. 5A.
Figure 7C:
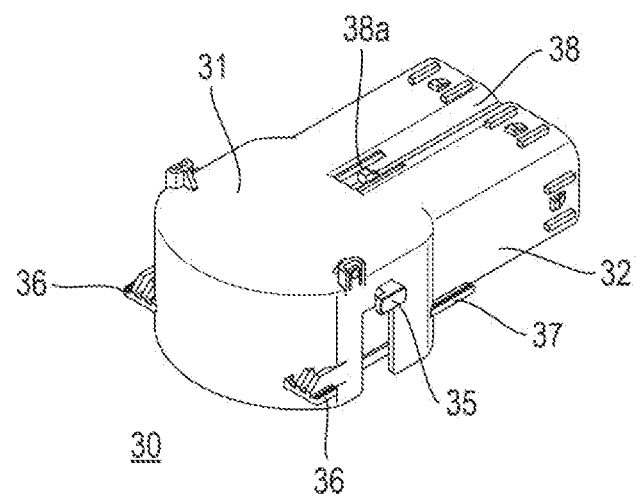
FIG. 7C is a perspective view of the housing of FIG. 5A viewed from above the housing.
Figure 7D:
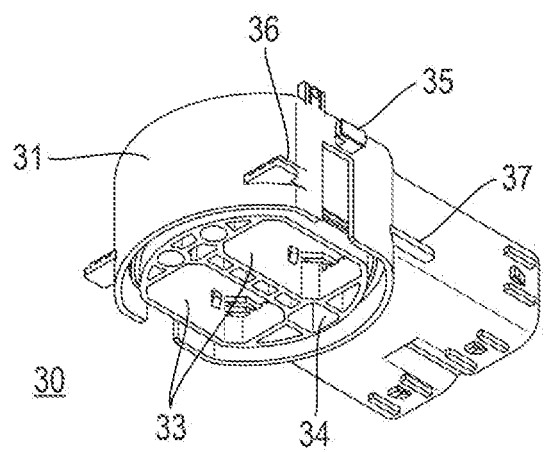
FIG. 7D is a perspective view of the housing of FIG. 5A viewed from below the housing.
Figure 8A:
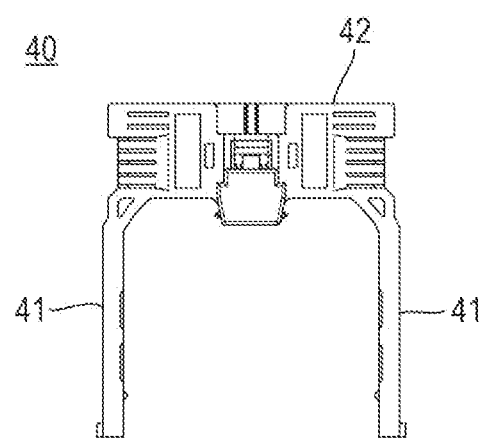
FIG. 8A is a plan view of a lever of FIG. 5A.
Figure 8B:
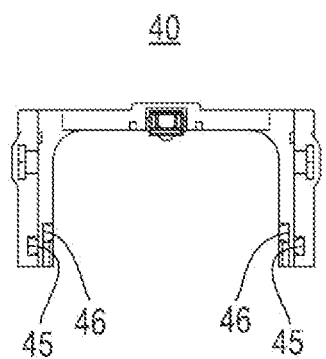
FIG. 8B is an elevational view of the lever of FIG. 5A.
Figure 8C:
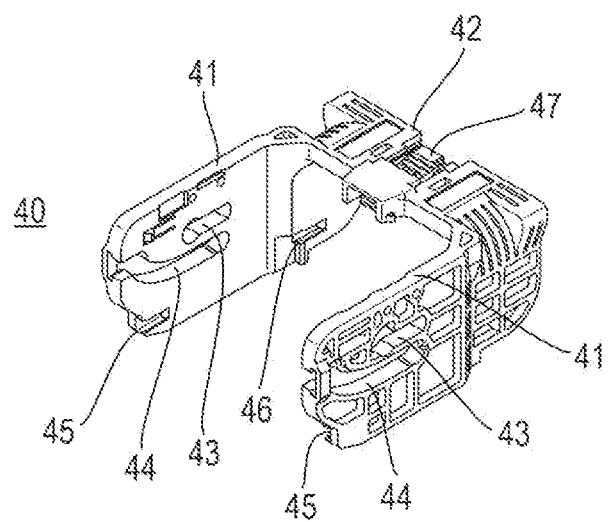
FIG. 8C is a perspective view of the lever of FIG. 5A viewed from an upper front side.
Figure 8D:
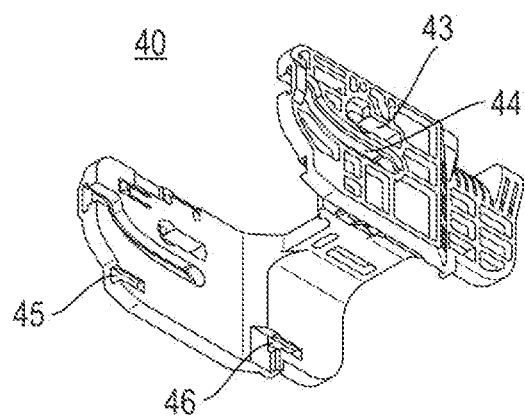
FIG. 8D is a perspective view of the lever of FIG. 5A viewed from a lower front side.
Figure 8E:
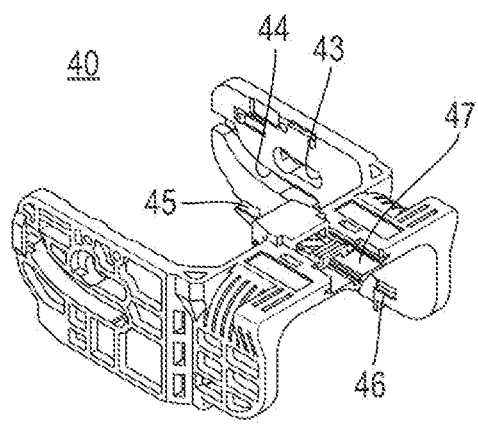
FIG. 8E is a perspective view of the lever of FIG. 5A viewed from an upper rear side.
Figure 8F:
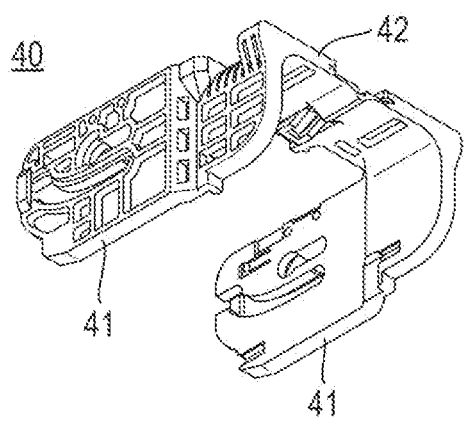
FIG. 8F is a perspective view of the lever of FIG. 5A viewed from a lower rear side.
Figure 9:
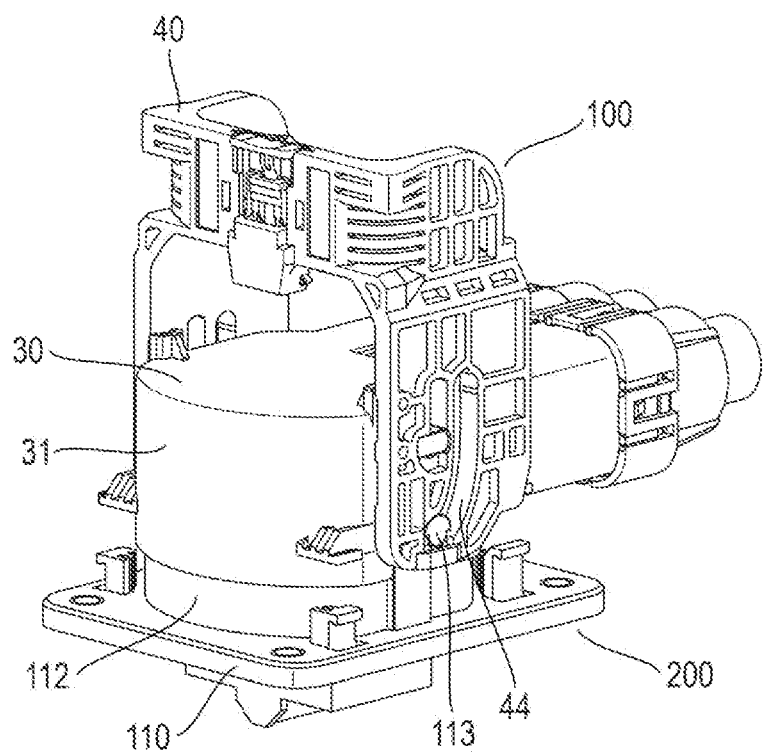
FIG. 9 is a perspective view illustrating a state in which the connector of the connector device according to the first embodiment of the present invention is on a fitting preparation position.

On the other hand, in FIGS. 6A, 613, and 6C illustrating the mating connector 200, 110 denotes a mating housing and 120 denotes a mating main terminal. Further, 130 denotes a mating interlock terminal. The mating connector 200 is to be mounted on a substrate.

The mating housing 110 includes a plate portion 111 and an opposite fitting portion 112. The opposite fitting portion 112 is shaped like a frame opening upward and is located on the plate portion 111 in a protruding manner. The opposite fitting portion 112 has a circumferential wall 112a, which has a frame like shape. A pair of driven bosses 113 are formed on outer side surfaces of the left and right portions (in FIG. 6A) of the circumferential wall 112a. The pair of driven bosses 113 protrude mutually outward. Further, a rearward facing portion (in a direction correspondent to the front rear direction of the housing 30) of the circumferential wall 112a is largely cut with a cutout 114. A pair of mating main terminals 120 is accommodated and positioned in the inside of the opposite fitting portion 112, and the mating interlock terminal 130 is accommodated and positioned in the inside of the opposite fitting portion 112 on the closer side to the cutout 114.

On the plate portion 111 of the mating housing 110, a pair of mating flange portions 115 and a pair of mating flange portions 116 are further provided. These four mating flange portions 115 and 116 are formed on respective upper ends of upright portions 117 and upright portions 118 that vertically rise from the plate portion 111. The mating flange portions 115, provided in a pair, are positioned on the left and right of the opposite fitting portion. 112 (in FIG. 6A) on the front side of the opposite fitting portion 112, and the mating flange portions 116, provided in a pair, are positioned on the left and right of the opposite fitting portion 112 on the rear side of the opposite fitting portion 112. The mating flange portions 115, provided in a pair, are configured to protrude mutually outward m the left-right direction, and the mating flange portions 116, provided in a pair, are also configured to protrude mutually outward in the left-right direction.

A fitting operation between the connector 100 and the mating connector 200 which are described above will now be described.

The fitting, between the connector 100 and the mating connector 200 is completed through a fitting process including states 1 to 5. FIGS. 9, 10, 11, and 12 illustrate appearances in the states 1 and 3 to 5 respectively, and FIGS. 13A to 13C, FIGS. 14A to 14C, and FIGS. 15A to 15C illustrate details of principal portions in the states 1 to 3 respectively. Further, FIGS. 16A to 16C. FIGS. 17A to 17C, and FIGS. 18A and 18B illustrate details of principal portions in the states 3 to 5 respectively.

<State 1: FIGS. 9, 13A, 13B, and 13C>

The state 1 is a state in which the fitting portion 31 of the housing 30 in the connector 100 whose lever 40 is on the first position is fitted to the opposite fitting portion 112 of the mating housing 110 in the mating connector 200 and the connector 100 is on a fitting preparation position with respect to the mating connector 200. The driven bosses 1113, provided in a pair, of the mating connector 200 are inserted in respective cam grooves 44 of the lever 40 in the connector 100. In the state 1, the main terminals 50 and the mating main terminals 120 are not connected with each other yet and the interlock terminal 60 and the mating interlock terminal 130 are not connected with each other yet either.

<State 2: Ms. 14A, 14B, and 14C>

Figure 14A:
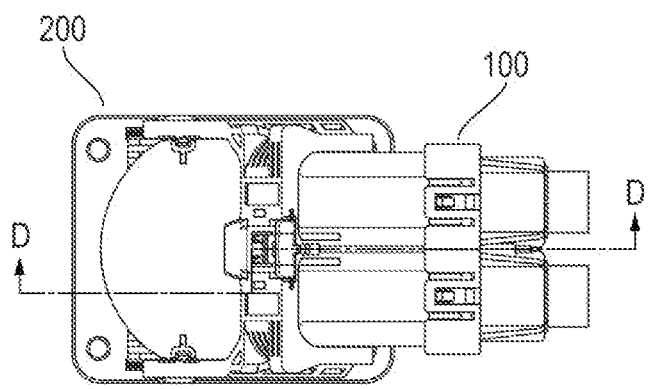
FIG. 14A is a plan view illustrating a state in which the lever is rotated to an intermediate position between a first position and the second position from the state illustrated in FIG. 9.
Figure 14B:
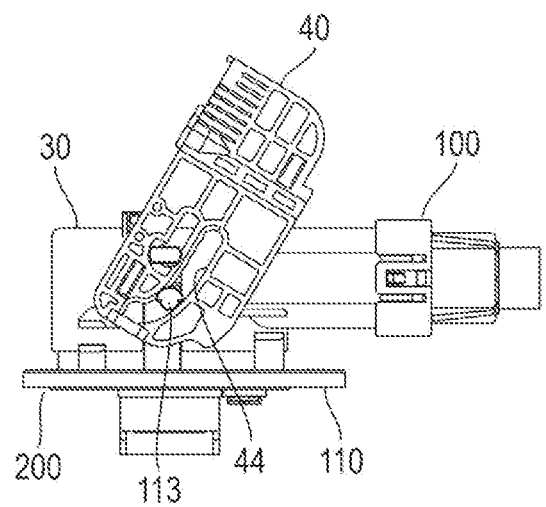
FIG. 14B is a right side view of FIG. 14A.
Figure 14C:
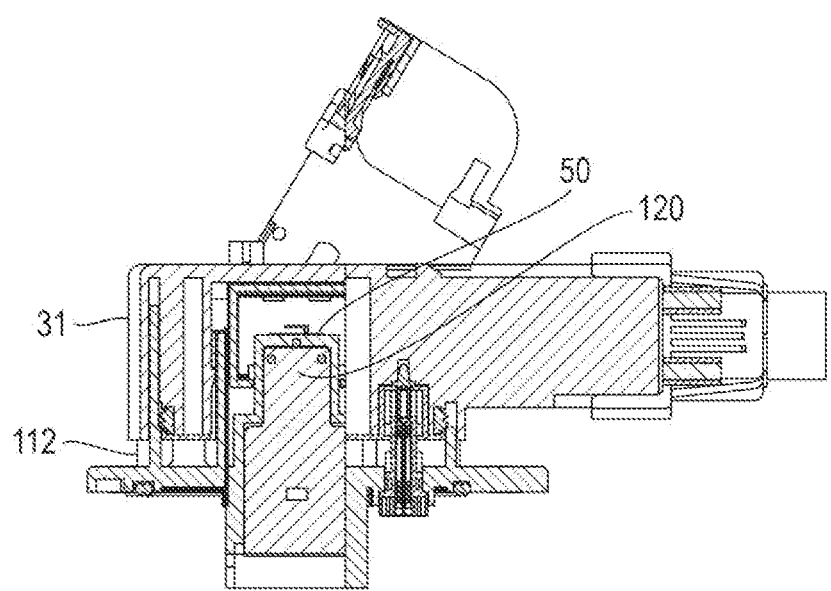
FIG. 14C is an enlarged view of a section taken along the D-D line of FIG. 14A.

The state 2 is a state in which the lever 40 is rotated to an intermediate position between the first position and the second position. In the state 2, the connector 100 is drawn toward the mating connector 200 by a cam mechanism and moves to a main-terminal contact starting position between the fitting preparation position and a fitting position. The cam mechanism is composed of the cam grooves 44 of the lever 40 and the driven bosses 113, which enter the cam grooves 44, of the mating connector 200. Accordingly, the main terminals 50 and the mating main terminals 120 are connected with each other as illustrated in FIG. 14C, that is, the main terminals 50 and the mating main terminals 120 are connected with each other by the time when the lever 40 reaches the second position.

When the connector 100 whose lever 40 is on the intermediate position is on the main-terminal contact starting position of the state 2 with respect to the mating connector 200, a rotation of the lever 40 to the first position causes the connector 100 to be pushed back by the cam mechanism apart from the main-terminal contact starting position and to move to the fitting preparation position. When the connector 100 leaves the main-terminal contact starting position, the connection between the main terminals 50 and the mating main terminals 120 is released.

<State 3: FIGS. 10, 15A, 1513, 15C, 016A, 16B, and 16C>

Figure 15A:
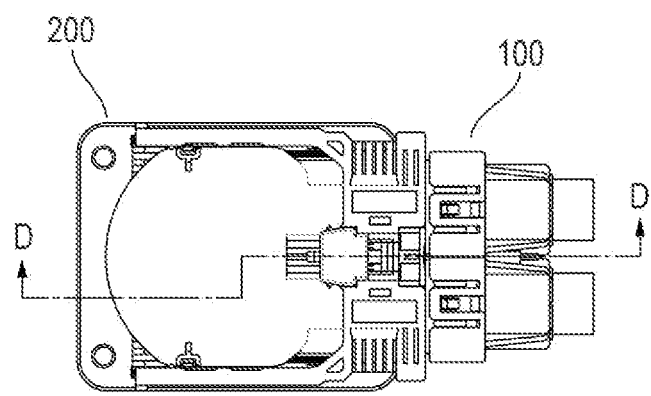
FIG. 15A is a plan view of the state illustrated in FIG. 10.
Figure 15B:
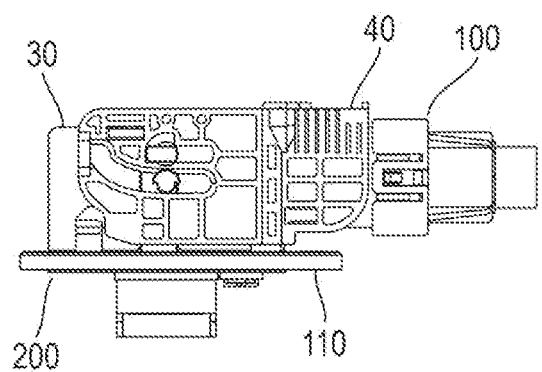
FIG. 15B is a right side view of FIG. 15A.
Figure 15C:
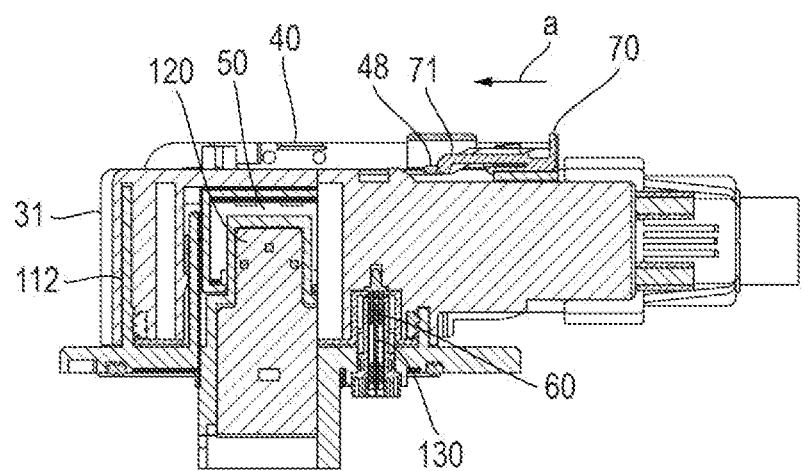
FIG. 15C is an enlarged view of a section taken along the D-D line of FIG. 15A.

The state 3 is a state in which the lever 40 is rotated to the second position that is a rotation completion position. In the state 3, the connector 100 is further drawn toward the mating connector 200 by the cam mechanism and moves to the fitting position which is closer to the mating connector 200. The connection between the main terminals 50 and the mating main terminals 120 is still maintained and the interlock terminal 60 and the mating interlock terminal 130 are connected with each other in this state 3 as illustrated in FIG. 15C. Consequently, the fitting is detected.

When the connector 100 whose lever 40 is on the second position is on the fitting position of the state 3 with respect to the mating connector 200, a rotation of the lever 40 to the intermediate position causes the connector 100 to leave the fitting position and to move to the main-terminal contact starting position. When the connector 100 leaves the fitting position, the connection between the interlock terminal 60 and the mating interlock terminal 130 is released in a state in which the connection between the main terminals 50 and the mating main terminals 120 is maintained.

Figure 16A:
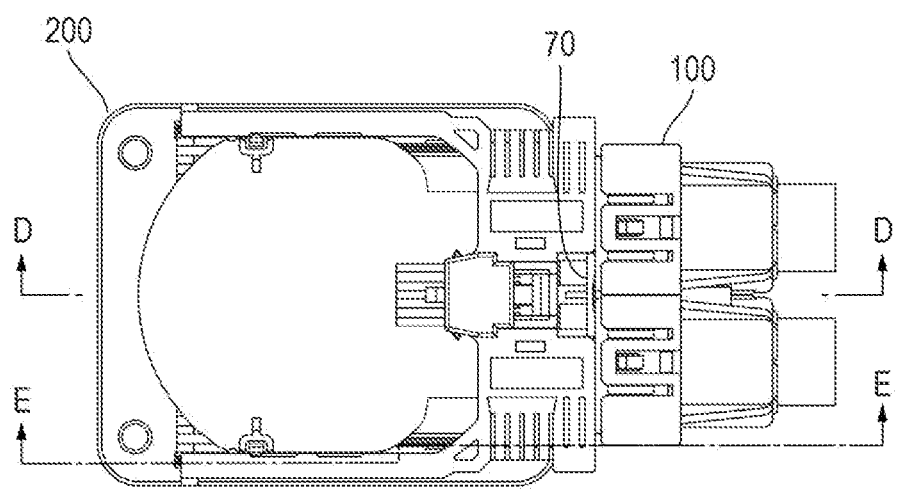
FIG. 16A is a plan view of the state illustrated in FIG. 10.
Figure 16B:
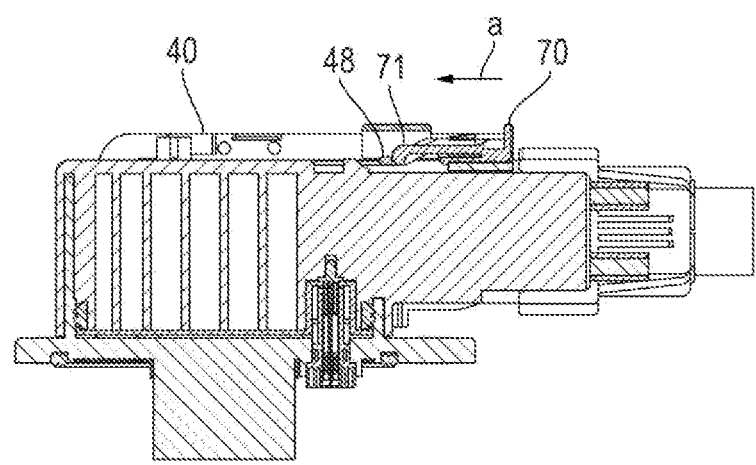
FIG. 16B is a sectional view taken along the D-D line of FIG. 16A.

An end of a locking piece 71 provided to the locking component 70, which is provided to the lever 40 for CPA, is abutted on a locking portion 48, provided to the lever 40, in the state 3 as illustrated in FIGS. 15C and 16B. Thus, the locking component 70 cannot be pushed in the arrow a direction.

Figure 16C:
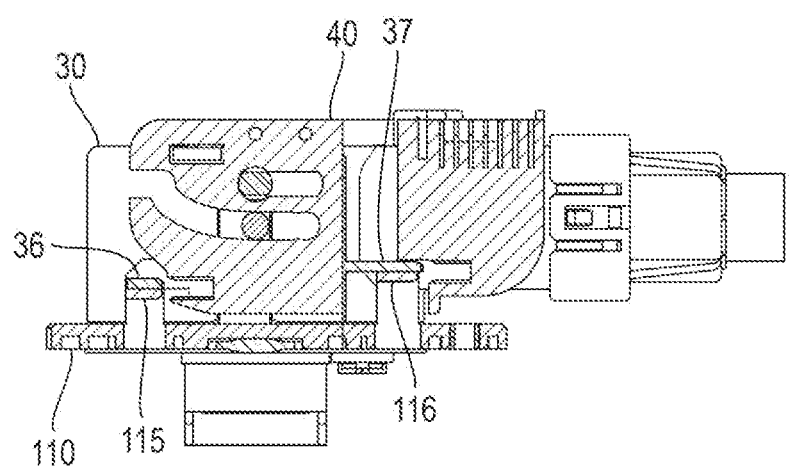
FIG. 16C is a sectional view taken along the E-E line of FIG. 16A.

The four flange portions 36 and 37 provided to the housing 30 of the connector 100 and the four corresponding mating flange portions 115 and 116 provided to the mating housing 110 of the mating connector 200 are in close contact with each other in this state 3. FIG. 16C illustrates this state.

<State 4: FIGS. 11, 17A, 1713, and 17C>

Figure 17A:
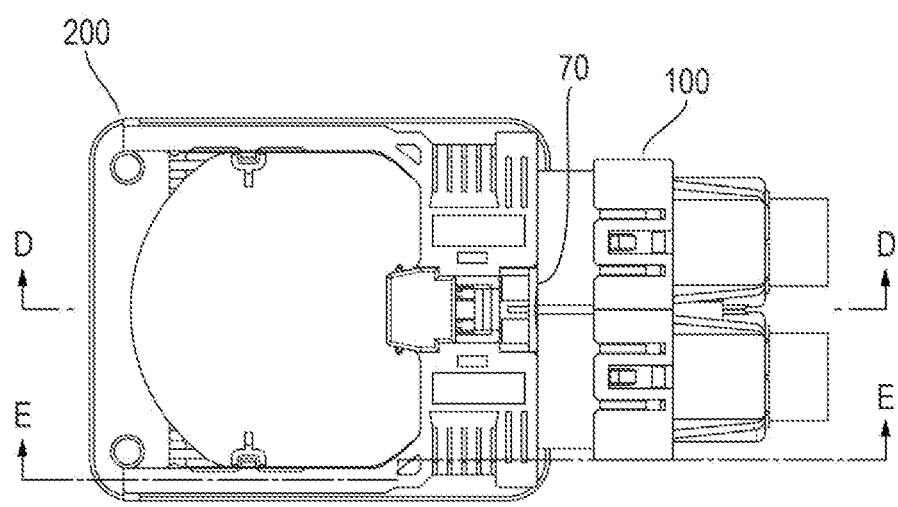
FIG. 17A is a plan view of the state illustrated in FIG. 11.
Figure 17B:
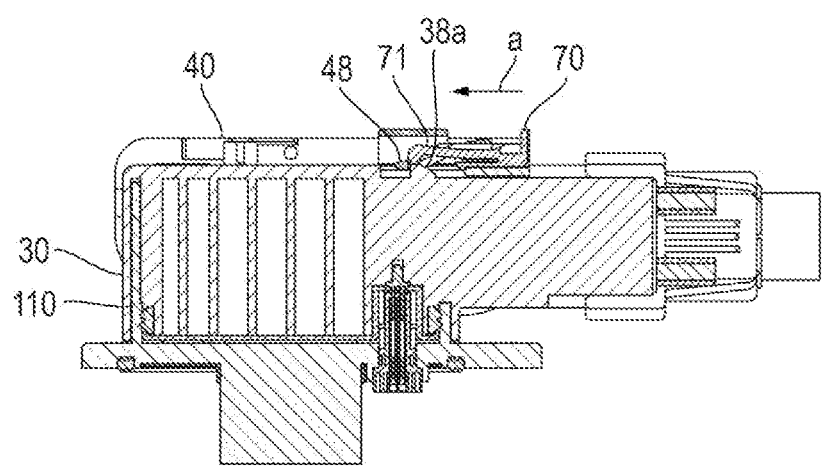
FIG. 17B is a sectional view taken along the D-D line of FIG. 17A.
Figure 17C:
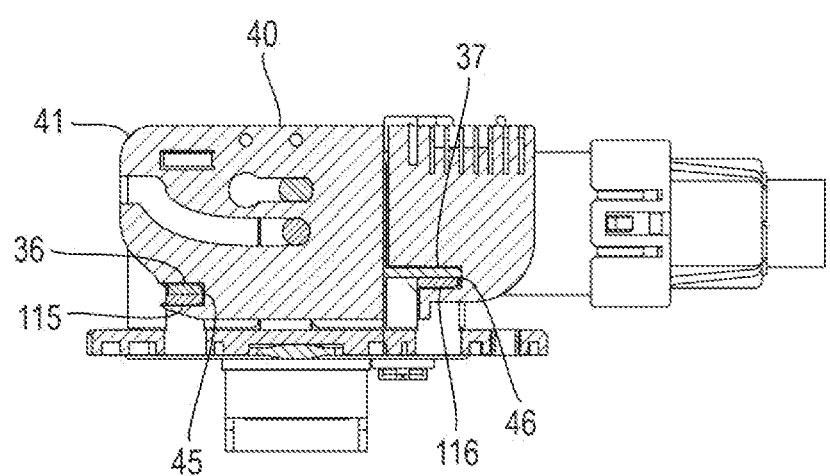
FIG. 17C is a sectional view taken along the E-E line of FIG. 17A.

The state 4 is a state in which the lever 40 is slid from the second position to the third position. In the state 4, the flange portions 36 and 37 of the housing 30 in the connector 100 and the mating flange portions 115 and 11 of the mating housing 110 in the mating connector 200 are accommodated in the groove portions 45 and 46, which are formed on the pair of arm portions 41 of the lever 40 in a manner to extend in a sliding direction (the longitudinal direction of the arm portions 41), in a manner to be in close contact with each other as illustrated in FIG. 17C. That is, the flange portions 36 and 37 and the mating flange portions 115 and 116 are held by the lever 40 in a manner in which the flange portions 36 and the mating flange portions 115 are in close contact with each other and the flange portions 37 and the mating flange portions 116 are in close contact with each other.

When the lever 40 of the connector 100 which is on the fitting position with respect to the mating connector 200 is slid from the third position to the second position, the holding of the flange portions 36 and 37 and the mating flange portions 115 and 116 by the lever 40 is released.

Meanwhile, when the lever 40 is slid from the second position to the third position, the end of the locking piece 71 of the locking component 70 rides on the protrusion 38a, provided to the housing 30, as illustrated in FIG. 17I. Thus, the abutment on the locking portion 48 is released, allowing the locking component 70 to be pushed in the arrow a direction.

Figure 12:
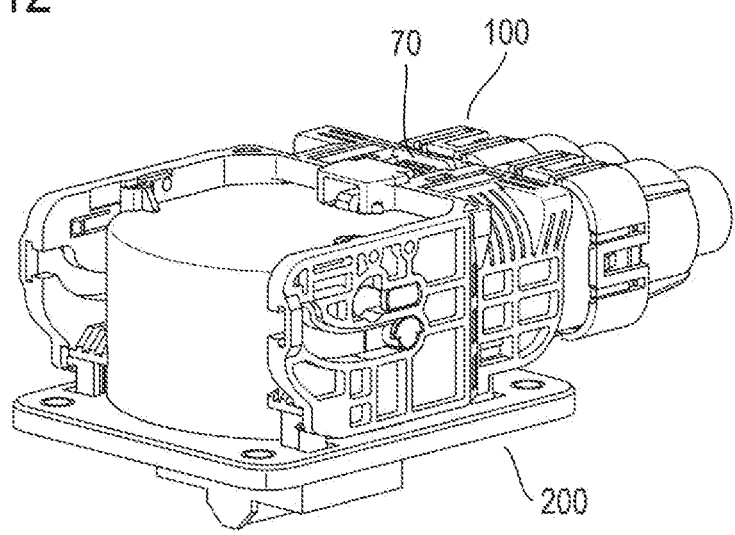
FIG. 12 is a perspective view illustrating a state in which a locking component is pushed from the state illustrated in FIG. 11.
Figure 13A:
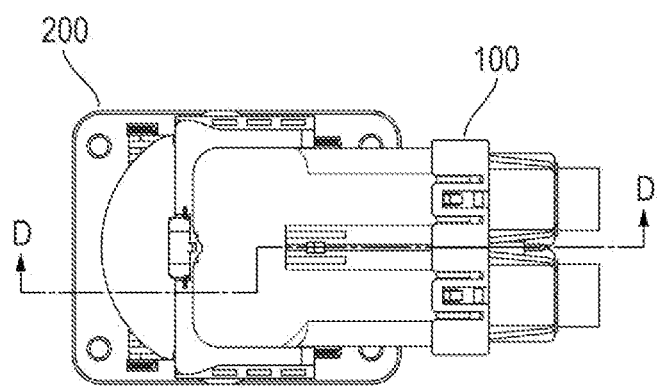
FIG. 13A is a plan view of the state illustrated in FIG. 9.
Figure 13B:
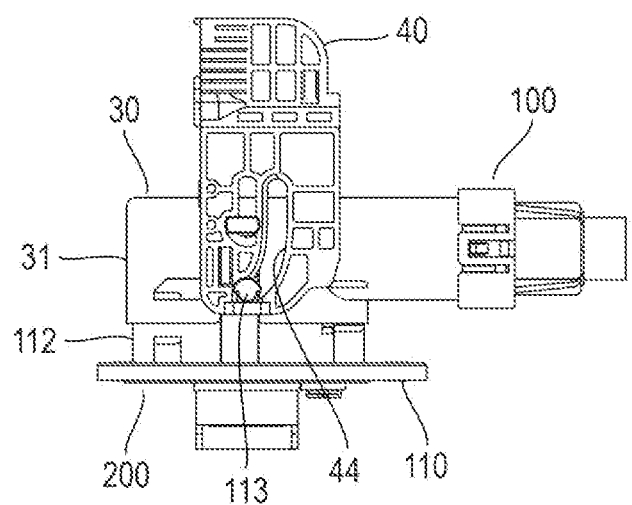
FIG. 13B is a right side view of FIG. 13A.
Figure 13C:
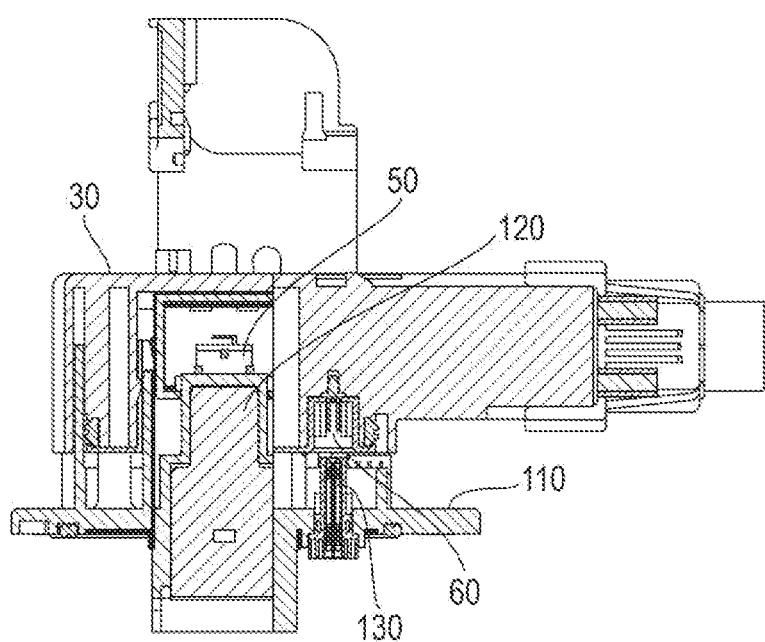
FIG. 13C is an enlarged view of a section taken along the D-D line of FIG. 13A.
Figure 18A:
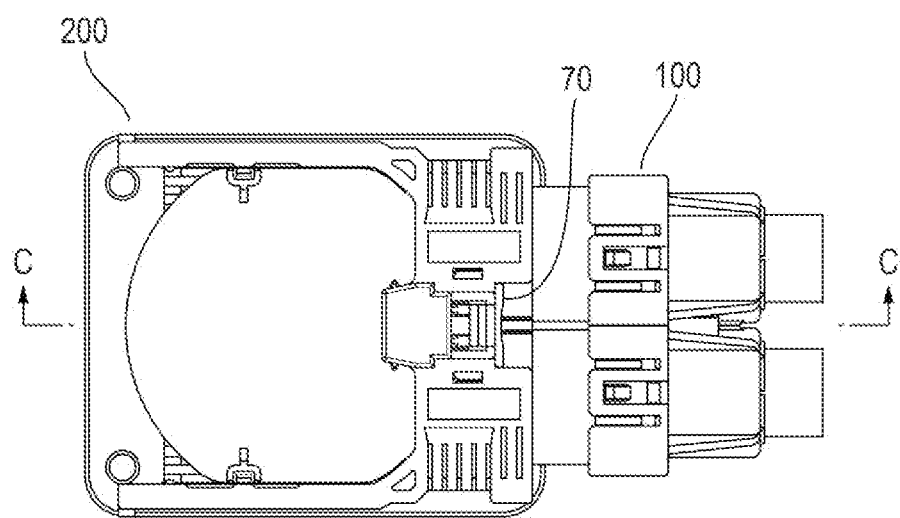
FIG. 18A is a plan view of the state illustrated in FIG. 12.
Figure 18B:
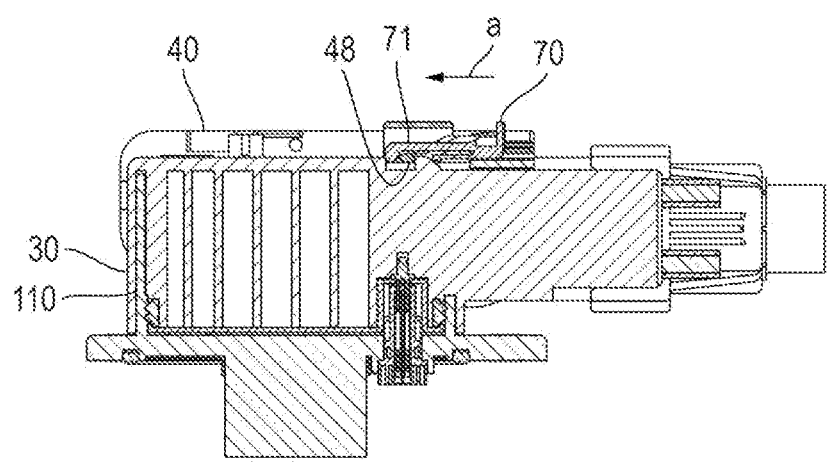
FIG. 18B is a sectional view taken along the C-C line of FIG. 18A.

<State 5: FIGS. 12,18A, and 18B>

The state 5 is a state in which the locking component 70 is pushed in the arrow a direction. In the state 5, the end of the locking piece 71 of the locking component 70 is positioned beyond the locking portion 48 of the lever 40 as illustrated in FIG. 18B. Accordingly, the lever 40 is locked and cannot be slid. That is, CPA is achieved.

The lock of the lever 40 can be released by pulling the locking component 70 in an opposite direction to the arrow a direction.

The configuration and the fitting operation of the connector device according to the first embodiment of the present invention that is composed of the connector 100 and the mating connector 200 have been described above. The connector device is equipped with electronics outside of it that, when the main terminals 50 and the mating main terminals 120 for large current are connected with each other and the interlock terminal 60 and the mating interlock terminal 130 for HVILs are connected with each other to close an HVIL circuit, then allow large current to flow between the main terminals 50 and the mating main terminals 120.

According to the connector device of the first embodiment described above, the following advantageous effects can be obtained.

The lever 40 performs a rotation operation and a sliding operation. The rotation from the first position to the second position fits the connector 100 to the mating connector 200 and the subsequent sliding from the second position to the third position blocks the rotation of the lever 40, namely, locks the fitting. In this example, in the sliding of the lever 40 from the second position to the third position, the flange portions 36 and the mating flange portions 115 are accommodated as being sandwiched in the groove portions 45 provided to the lever 40 in a manner in which the flange portions 36 and the mating flange portions 115 are in close contact with each other, and the flange portions 37 and the mating flange portions 116 are accommodated as being sandwiched in the groove portions 46 provided to the lever 40 in a manner in which the flange portions 37 and the mating flange portions 116 are in close contact with each other. Consequently, the housing 30 of the connector 100 and the mating housing 110 of the mating connector 200 are firmly held by the lever 40.

Accordingly, relative movement (rattling) between the connector 100 and the mating connector 200 can be prevented, being able to prevent an occurrence of failures such as rubbing and scraping between housings, rubbing and scraping between terminals, and peeling of plating due to rattling. Thus, superior vibration resistance can be obtained. That is, a connector device can be realized whose quality and connection performance do not degrade even when used in a vibration environment.

Here, a cross section orthogonal to the sliding direction of the lever 40 of each of the flange portions 36 and 37, mating flange portions 115 and 116, and groove portions 45 and 46 of the lever 40, in the state in which the connector 100 is positioned on the fitting position with respect to the mating connector 200, preferably has a thickness which increases toward a direction away from the housing 30 and the mating housing 110, that is, the protruding direction of the flange portions 36 and 37 and the mating flange portions 115 and 116. This configuration realizes securer holding of the flange portions 36 and 37 and the mating flange portions 115 and 116 by the groove portions 45 and 46 and can prevent cancellation of the holding caused by movement of the lever 40 in the lateral direction (the left-right direction (in FIG. 19A) orthogonal to the sliding direction), for example.

Figure 19A:
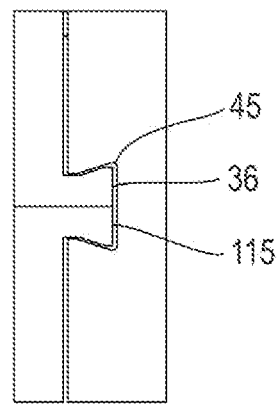
FIG. 19A illustrates a first shape example of a flange portion, a rating flange portion, and a groove portion.

FIG. 19A illustrates the above-described cross-sectional shape of a portion in which the flange portion 36 and the mating flange portion 115 are held in the groove portion 45.

Figure 19B:
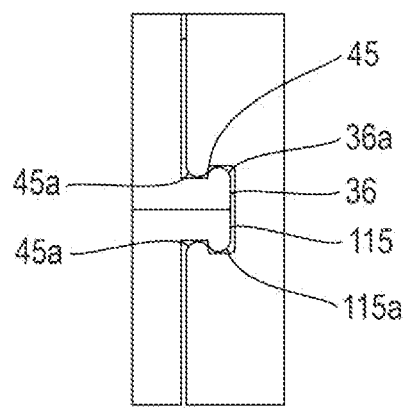
FIG. 19B illustrates a second shape example of the flange portion, the mating flange portion, and the groove portion.
Figure 19C:
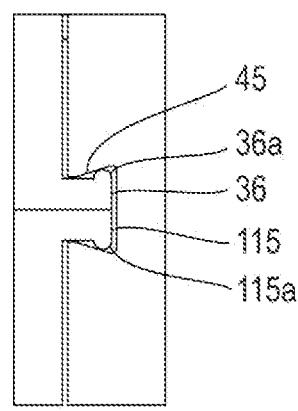
FIG. 19C illustrates a third shape example of the flange portion, the mating flange portion, and the groove portion.

The shape for securing the holding of the flange portions 36 and 37 and the mating flange portions 115 and 116 by the groove portions 45 and 46 is not limited to the cross-sectional shape illustrated in FIG. 19A but cross-sectional shapes as those illustrated in FIGS. 19B and 19C may further be employed.

FIG. 19B illustrates a configuration in which projections 36a and 115a are formed on respective outer side surfaces of protruding-direction ends of the flange portion 36 and mating flange portion 115, and projections 45a are formed on respective inner side surfaces, which are opposed to each other, of an opening portion of the groove portion 45. Further, FIG. 19C illustrates a configuration obtained by combining the groove portion 45 illustrated in FIG. 19A with the flange portion 36 and the mating flange portion 115 illustrated in FIG. 19B. The cross-sectional shapes of the projections 36a, 115a, and 45a are not limited to the shapes illustrated in FIGS. 19B and 19C but may be a square, a trapezoid, or a triangle.

In this example, the lever 40 is provided with four groove portions 45 and 46, and the housing 30 of the connector 100 and the mating housing 110 of the mating connector 200 are held at four points around the fitting portion 31 of the housing 30. However, the number of groove portions, that is, the numbers of flange portions and mating flange portions respectively provided to the housing 30 and the mating housing 110 are not limited to four.

Second Embodiment

FIGS. 20A and 20B and FIGS. 21A to 21C respectively illustrate a connector 400 and a mating connector 500 that constitute a connector device according to a second embodiment. In respective components of the connector 400 and the mating connector 500, portions corresponding to those of the first embodiment will be provided with the same reference characters and detailed description thereof will be omitted.

In this example, the lever 400 of the connector 400 rotates in a reverse direction to that of the first embodiment, that is, the lever 40 rotates in a direction away from the cables 300.

Further, the interlock terminal 60 of the connector 400 is accommodated in an interlock housing 90 attached to the housing 30 in this example.

The housing 30 of the connector 400 is composed of the fitting portion 31, the cable accommodating portion 32, and an attaching portion 39 that is positioned on the front surface of the fitting portion 31. The guide shafts 35 are formed in a pair on respective lateral surfaces of the fitting portion 31. Further, the flange portions 36 are formed in a pair on the front sides of respective lateral surfaces of the fitting portion 3:1 and the flange portions 37 are formed in a pair on the rear sides of the respective lateral surfaces of the fitting portion 31. The attaching, portion 39 is a portion to which the interlock housing 90 is attached and has a substantially cylindrical shape that is opened in the vertical direction. On an intermediate portion of the attaching portion 39 in the vertical direction, slits 39a are formed in a pair on mutually opposed positions. The slit 39a extends rearward from the front end of the attaching portion 39.

The lever 40 includes the pair of arm portions 41, the coupling portion 42, and an operation portion 49, as illustrated in Fits. 22A, 22B, 22C, 22D, and 22E. The coupling portion 42 couples proximal ends of the arm portions 41 provided in a pair. The operation portion 49 is positioned on a side opposite to the arm portions 41 with respect to the coupling portion. 42 that is interposed therebetween. The operation portion 49 is positioned on the lower end side (in FIG. 22C) of the coupling portion 42, and reinforcing walls 49a, which are provided in a pair and extend in the vertical direction (in FIG. 22C), are positioned on both ends in the width direction of the operation portion 49 in a manner to be continuously formed between the coupling portion 42 and the operation portion 49.

On each of the pair of arm portions 41, the guide groove 43 and the cam groove 11 are formed. Further, the groove portions 46 are formed on the respective inner surfaces of the distal ends of the arm portions 41, and the groove portions 45 are further formed on the respective inner surfaces of their proximal portions. Here, the groove portion 45 in this example is formed as a slit that opens on the outer surface of the arm portion 41.

An opening 42a is formed on the lower portion of the coupling portion 42 and an opening 49h communicating with the opening 42a is also formed on the operation portion 49. On both sides in the width direction of the opening 49b of the operation portion 49, wall portions 49c extending in the vertical direction (in FIG. 22C) are respectively formed. On respective inner side surfaces of the wall portions 49c, slide insertion portions 49d are formed in a protruding manner. The slide insertion portion 49d is a projection that extends in the longitudinal direction of the arm portion 41 and has a cutout 49e on the middle in the longitudinal direction thereof.

The interlock housing 90 includes a cylindrical portion 91 and an operation portion 92. The operation portion 92 is positioned on an upper end of the cylindrical portion 91 and has a shape to lid the cylindrical portion 91. The detailed configuration of the interlock housing 90 and its attachment to the attaching portion 39 of the housing 30 will be described later.

Figure 20A:
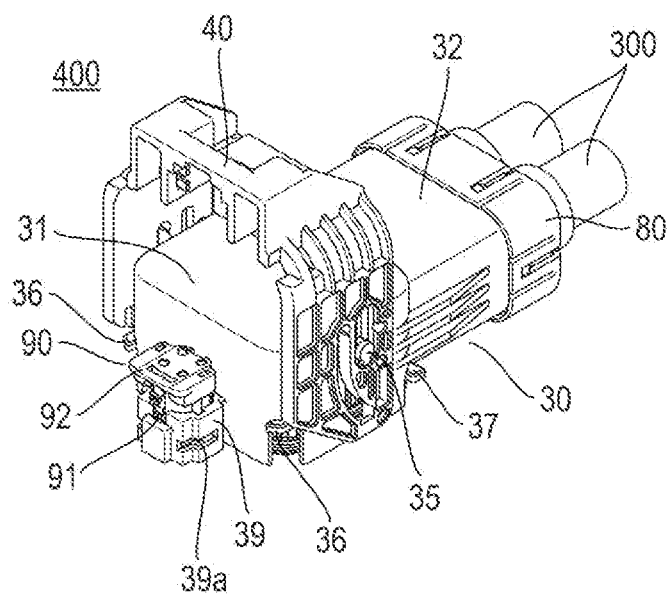
FIG. 20A is an upper perspective view illustrating a connector of a connector device according to a second embodiment of the present invention.
Figure 20B:
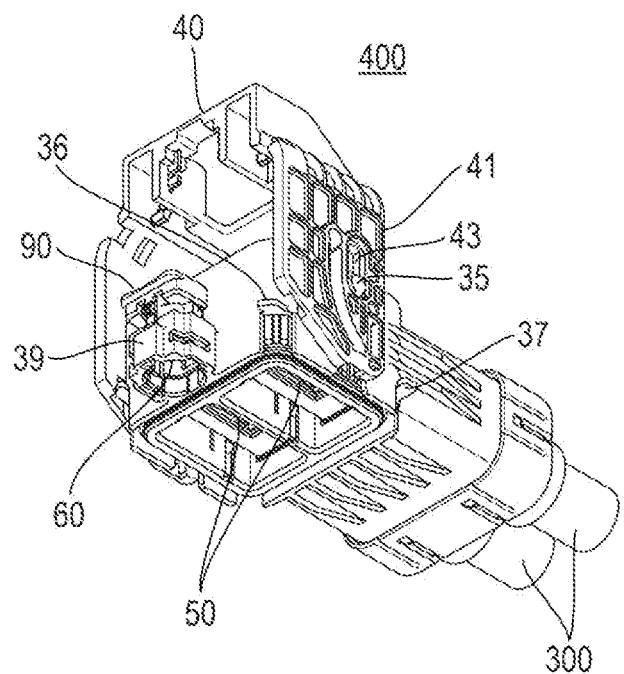
FIG. 20B is a lower perspective view of the connector illustrated in FIG. 20A.

The lever 40 is attached to the housing 30 similarly to the first embodiment and is to be positioned on the first position, the second position, or the third position with respect to the housing 30 as is the case with the first embodiment. FIGS. 20A and 20B illustrate a state in which the lever 40 is on the first position.

Figure 21A:
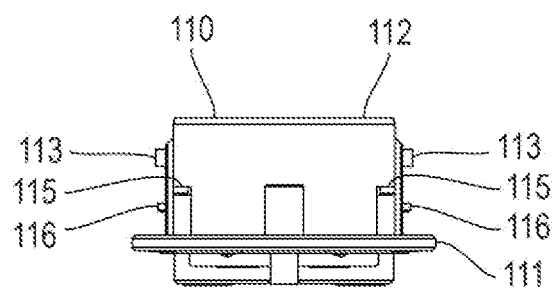
FIG. 21A is an devotional view illustrating a mating connector of the connector device according to the second embodiment of the present invention.
Figure 21B:
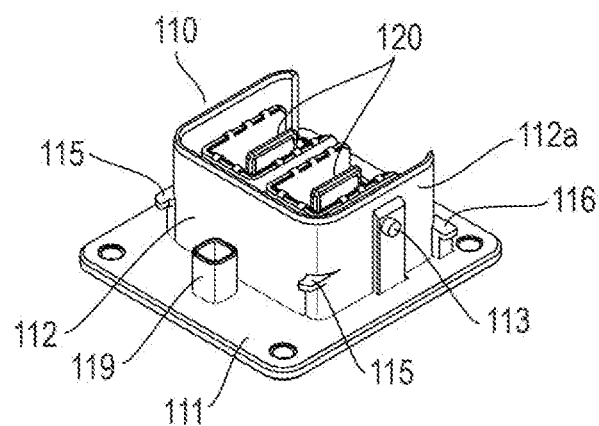
FIG. 21B is a front side perspective view of the mating connector illustrated in FIG. 21A.
Figure 21C:
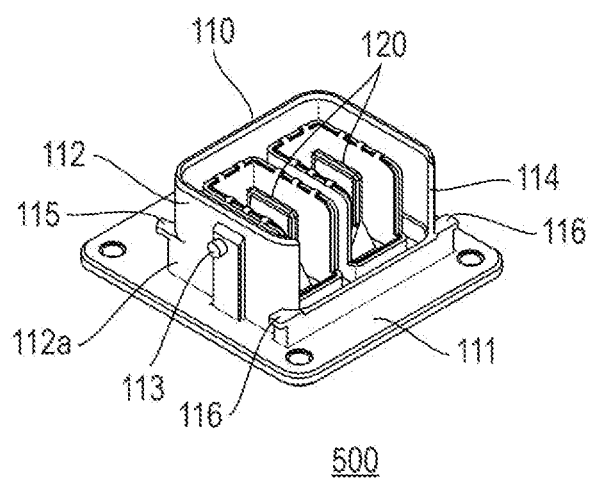
FIG. 21C is a rear side perspective view of the mating connector illustrated in FIG. 2 IA.

The mating connector 500 is to be mounted on a substrate, and the mating housing 110 of the mating connector 500 includes the plate portion 111 and the opposite fitting portion 112 that is positioned on the plate portion 111, as illustrated in FIGS. 21A, 21B, and 21C. On the circumferential wall 112a of the opposite fitting portion 112, the pair of driven bosses 113 is formed. The pair of mating flange portions 115 and the pair of mating flange portions 116 are formed in a manner to protrude from the circumferential wall 112a in this example. The pair of mating main terminals 120 is accommodated and positioned in the inside of the opposite fitting portion 112.

At the front of the opposite fitting portion 112, that is, at an opposite side to a side on which the cutout 114 formed on the circumferential wall 112a is positioned, an attaching portion 119 is formed on the plate portion 111 in a protruding manner. The attaching portion 119 has a cylindrical shape that opens upward and the mating interlock terminal 130 is attached and fixed to the attaching portion 119.

A fitting operation between the connector 400 and the mating connector 500 which are described above will now be described.

Figure 23:
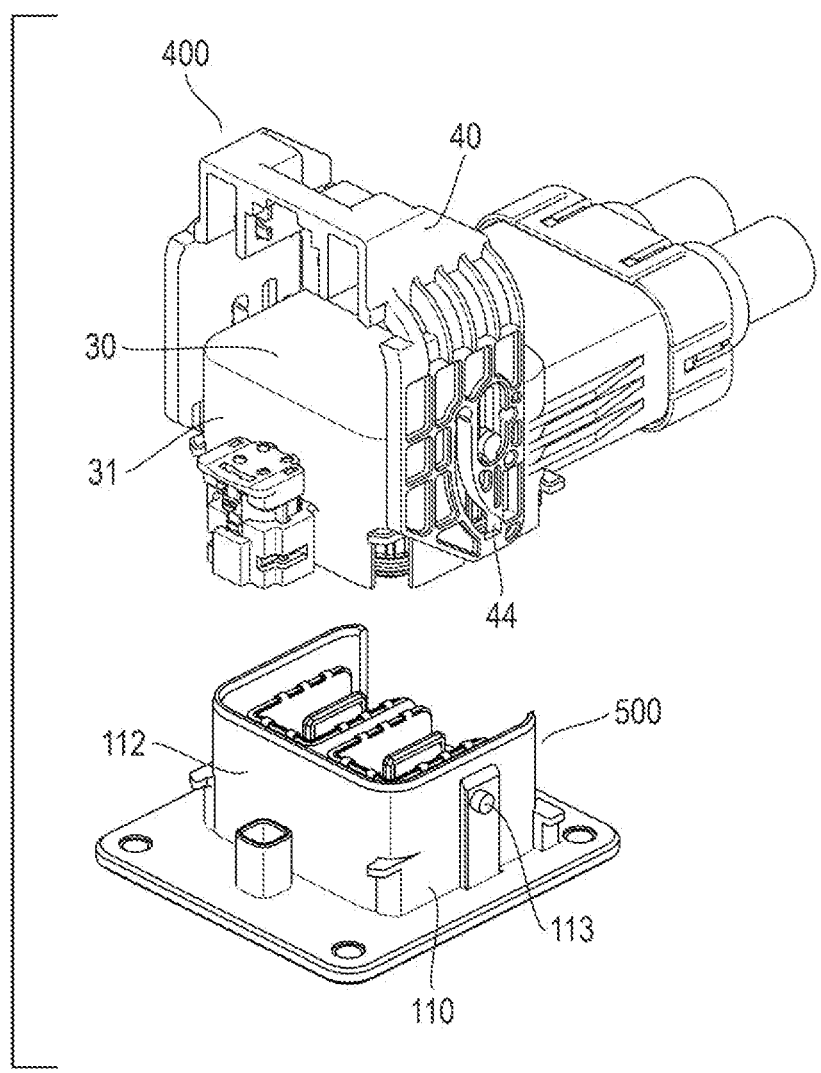
FIG. 23 is a perspective view illustrating, a state before fitting the connector illustrated in Ha 20A to the mating connector illustrated in FIG. 21A.
Figure 24:
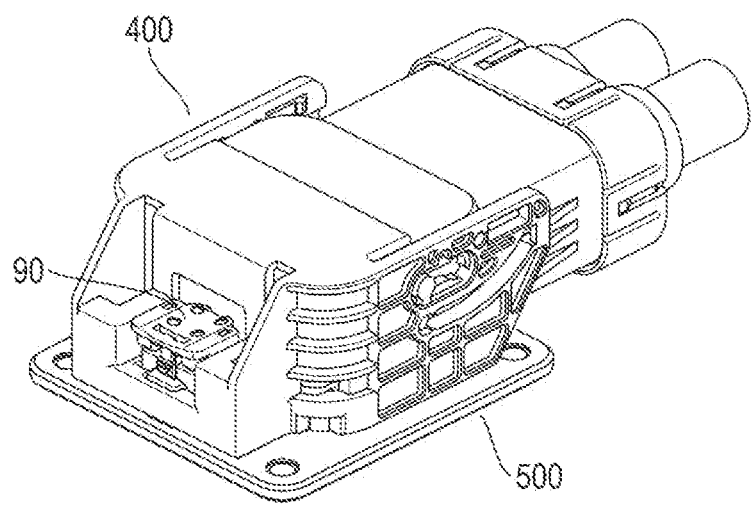
FIG. 24 is a perspective view illustrating a connection completion state between the connector illustrated in FIG. 20A and the mating connector illustrated in FIG. 21A.

The fitting process between the connector 400 and the mating connector 500 can be described based on four states that are states A to a FIG. 23 illustrates an appearance of the connector 400 and the mating connector 500 in a state before there fitting (immediately before the state A), and FIG. 24 illustrates an appearance of them in the state D in which the fitting is completed. Further, FIGS. 25A and 25B and FIGS. 26A and 26B illustrate details of principal portions in the states B and C respectively, and FIGS. 27A and 27B and FIGS. 28A and 28B illustrate the interlock housing 90 in the states A to D.

Figure 27A:
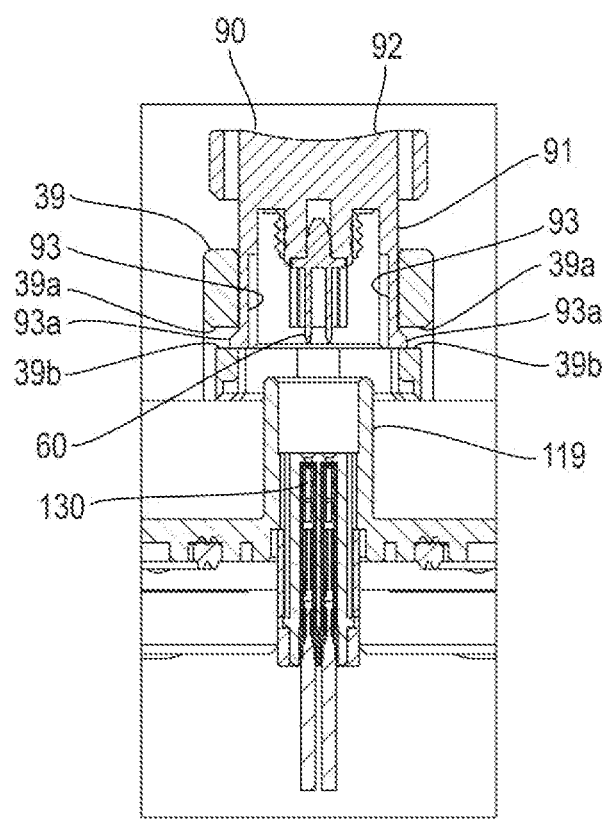
FIG. 27A is a partially enlarged sectional view illustrating a state of an interlock housing in a state in which the connector of the connector device according to the second embodiment of the present invention is on a fitting preparation position.

<State A: FIG. 27A>

The state A is a state in which the fitting portion 31 of the housing 30 in the connector 400 whose lever 40 is on the first position is fitted to the fitted portion 1:12 of the mating housing 110 in the mating connector 500 and the connector 400 is on a fitting preparation position with respect to the mating connector 500. The driven bosses 113, provided in a pair, of the mating connector 500 are inserted in respective cam grooves 44 of the lever 40 in the connector 400. In the state A, the main terminals 50 and the mating main terminals 120 are not connected with each other yet.

In the interlock housing 90 that is attached to the attaching portion 39 of the housing 30 in the connector 400 in a manner to be able to slide between an opening position and a closing position, protrusion portions 93a on ends (lower ends) of a pair of spring pieces 93 are positioned on natural positions in a manner to be in the respective slits 39a of the attaching portion 39 as illustrated in FIG. 27A. The spring piece 93 is formed by cutting the cylindrical portion 91, and the protrusion portion. 93a protrudes outward. Accordingly, the interlock housing 90 cannot be pushed down even by pushing the operation portion 92 thereof because the protrusion portions 93a are abutted on abutting surfaces 39b, which are lower inner surfaces of the slits 39a, that is, the interlock housing 90 is blocked from sliding to a closing position, on which the interlock terminal 60 of the connector 400 and the mating interlock terminal 130 of the mating connector 500 are mutually connected.

Figure 25A:
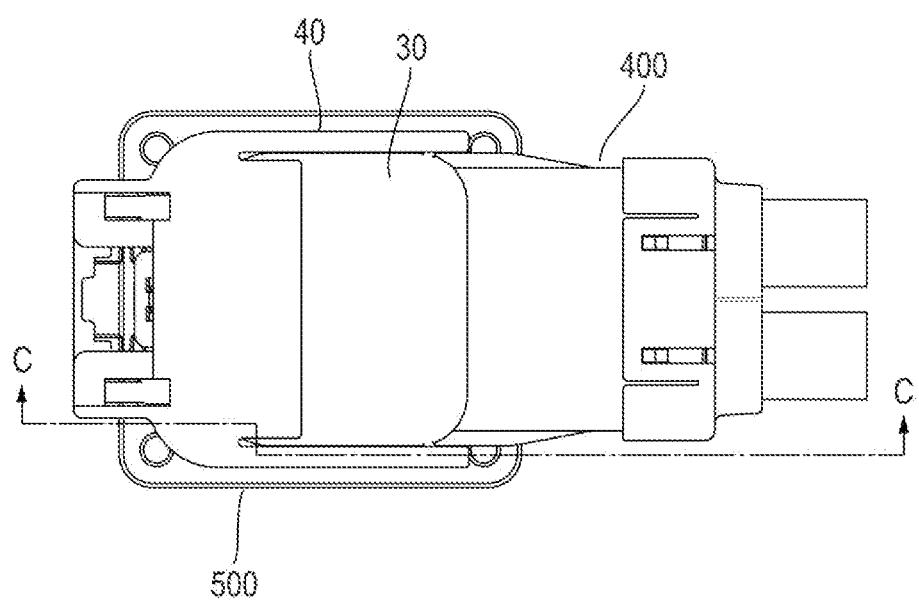
FIG. 25A is a plan view illustrating a state in which the connector illustrated in FIG. 20A and the mating connector illustrated in FIG. 21A are fitted to each other and the lever is rotated to a second position.
Figure 25B:
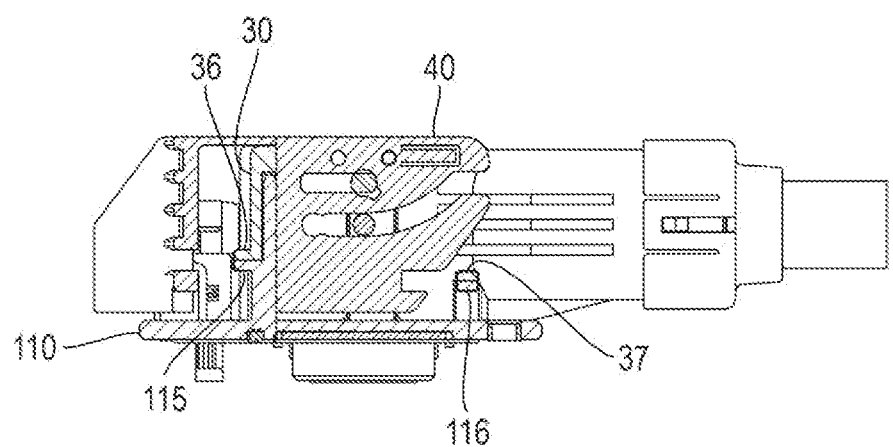
FIG. 25B is a sectional view taken along the C-C line of FIG. 25A.
Figure 27B:
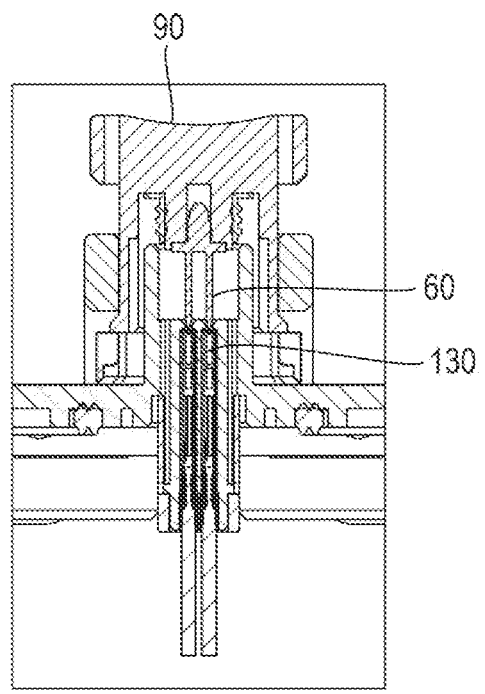
FIG. 27B is a partially enlarged sectional view illustrating a state in which the lever is rotated to the second position from the state illustrated in FIG. 27A.

<State B: FIGS. 25A, 25B, and 27B>

The state B is a state in which the lever 40 is rotated from the first position to the second position. In the state B, the connector 400 is drawn to the fitting position with respect to the mating connector 500 by the cam mechanism, and the main terminals 50 of the connector 400 and the mating main terminals 120 of the mating connector 500 are connected with each other by the time when the lever 40 reaches the second position.

The interlock housing 90 is on the opening position as in the state A. Even though the connector 400 is brought closer to the mating connector 500, the interlock terminal 60 and the mating interlock terminal 130 are not connected with each other yet and are still disconnected from each other, as illustrated in FIG. 27B.

The four flange portions 36 and 37 provided to the housing 30 of the connector 400 and the four corresponding mating flange portions 115 and 116 provided to the mating housing 110 of the mating connector 500 are in close contact with each other in this state. FIG. 25B illustrates this state.

Figure 26A:
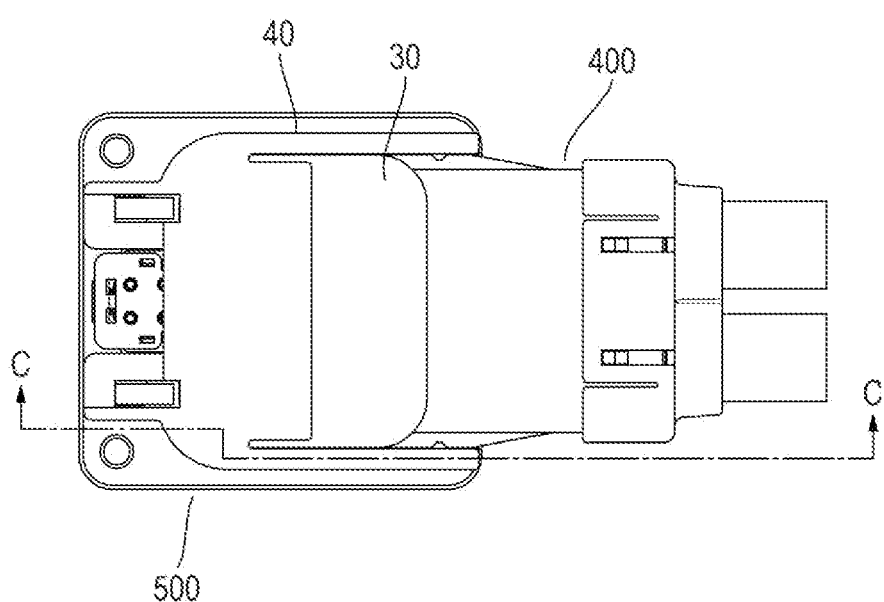
FIG. 26A is a plan view illustrating a state in which the lever is slid to a third position from the state illustrated in FIG. 25A.
Figure 26B:
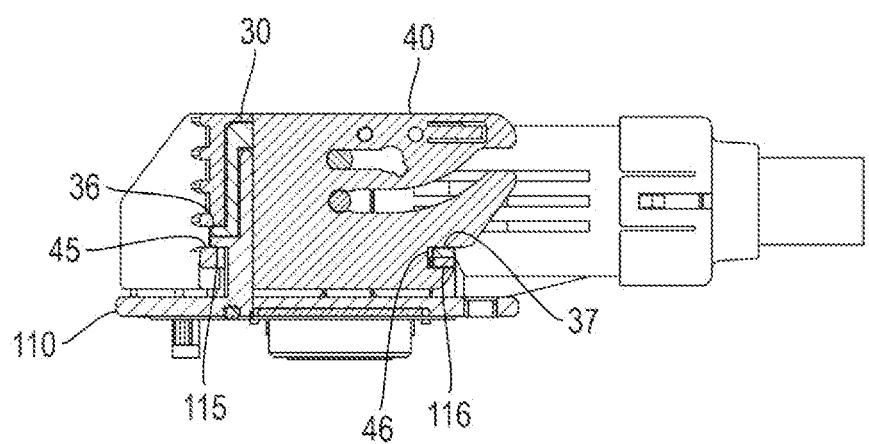
FIG. 26B is a sectional view taken along the C-C line of FIG. 26k.
Figure 28A:
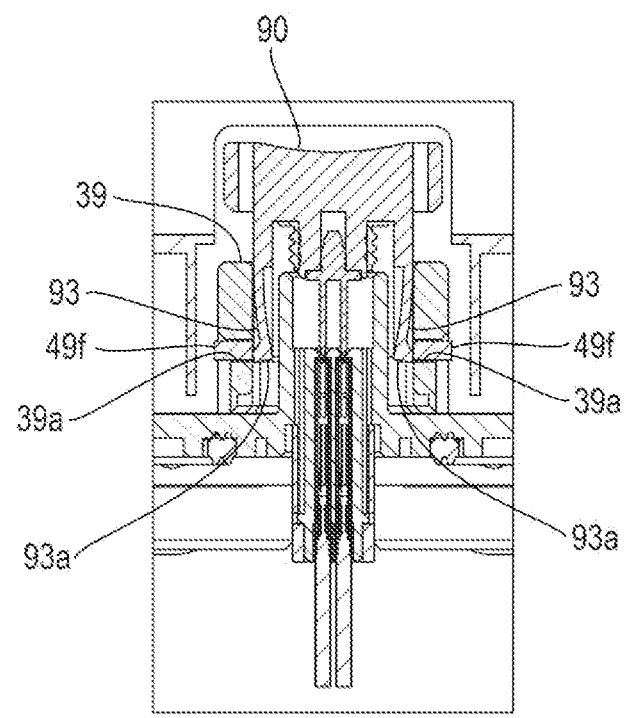
FIG. 28A is a partially enlarged sectional view illustrating a state in which the lever is slid to the third position from the state illustrated in FIG. 27B.

<State C: FIGS. 26A, 26B and 28A>

The state C is a state in which the lever 40 is slid from the second position to the third position and the slide insertion portions 49d, provided in a pair, of the lever 40 enter the slits 39a of the attaching portion 39 of the housing 30. Accordingly, the protrusion portions 93a of the pair of spring pieces 93 in the interlock housing 90 are pressed by respective pressing portions 49f (see FIGS. 22I, 22B, 22C, 22D, and 22E) on the ends of the slide insertion portions 49d, being displaced from the natural positions to retracted positions, as illustrated in FIG. 28A. This enables the interlock housing 90, which is attached to the attaching portion 39 of the housing 30 in a manner to be able to slide between the opening position and the closing position for the interlock housing 90 to take, to slide to the closing position.

The sliding of the lever 40 allows the flange portions 36 and 37 of the housing 30 in the connector 400 and the mating flange portions 115 and 116 of the mating housing 110 in the mating connector 500 to be accommodated in the groove portions 45 and 46 of the lever 40 in a manner in which the flange portions 36 and the mating flange portions 115 are in close contact with each other and the flange portions 37 and the mating flange portions 116 are in close contact with each other, whereby the flange portions 36 and 37 and the mating flange portions 115 and 1116 are held by the lever 40, as illustrated in FIG. 26B.

Figure 28B:
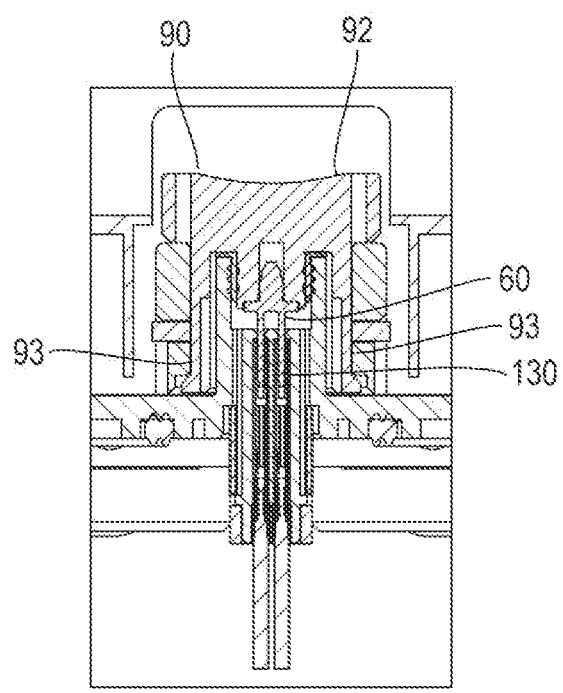
FIG. 28B is a partially enlarged sectional view illustrating a state in which the interlock housing is slid to a closing position from the state illustrated in FIG. 28A.

<State D; FIGS. 24 and 28B>

The state D is a state in which the interlock housing 90, which is positioned on the opening position in the state C, is pushed along with pushing of the operation portion 92 and slid to be positioned on the closing position. In the state D, the interlock terminal 60 and the mating interlock terminal 130 are mutually connected as illustrated in FIG. 28B. Consequently, fitting is detected.

In the state in which the interlock housing 90 is pushed down to the closing position, although detailed illustrations are omitted, a pair of lever slide blocking portions, which is formed on the cylindrical portion 91 of the interlock housing 90 in a manner to protrude outward, enter the cutouts 49e which are formed on the slide insertion portions 49d of the lever 40. Accordingly, the lever 40 is fixed on the third position and sliding back to the second position is blocked.

The connector device of the second embodiment has been described above. The connector device of the second embodiment can provide the same advantageous effects as those of the connector device of the first embodiment described above.

In addition, in the second embodiment, the connection and disconnection of the HVILs are performed by pushing down and pulling up the interlock housing 90 that is provided separately from the lever 40. That is, the connection of the HVILs is performed in a manner such that after the main terminals 50 and the mating main terminals 120 are connected with each other through the rotation operation of the lever 40, the sliding operation of the lever 40 is performed and further, the interlock housing 90 is pushed down. On the other hand, the disconnection between the main terminals 50 and the mating main terminals 120 is performed in a manner such that after the HVILs are disconnected from each other by pulling up the interlock housing 90, the sliding operation of the lever 40 is performed and further, the rotation operation of the lever 40 is performed.

Thus, sufficient time interval is provided between connection or disconnection of main terminals for large current and connection or disconnection of HVILs and accordingly, fitting and separation works of the connector device can be performed more safely.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector device comprising:
    a connector that includes a housing, a lever, and a main terminal; and
    a mating connector that includes a mating housing and a mating main terminal, wherein
    a guide groove is formed on one of the lever and the housing and a guide shaft is formed on an other,
    the lever is attached to the housing so that the guide shaft is positioned on the guide groove and the lever is thereby capable of rotating between a first position and a second position and sliding between the second position and a third position, the first position, the second position and the third position being positions for the lever to take with respect to the housing,
    one of a cam groove and a driven boss, the cam groove and the driven boss constituting a cam mechanism, is formed on the lever and the other is formed on the mating housing,
    when the connector of which the lever is on the first position is on a fitting preparation position with respect to the mating connector, a rotation of the lever to the second position causes the connector to be drawn to a fitting position by the cam mechanism, the fitting position being closer to the mating connector than the fitting preparation position, connecting the main terminal and the mating main terminal with each other by time when the lever reaches at least the second position, and
    when the connector of which the lever is on the second position is on the fitting position with respect to the mating connector, a rotation of the lever to the first position causes the connector to be pushed back to the fitting preparation position by the cam mechanism, releasing a connection between the main terminal and the mating main terminal; and wherein
    the housing includes a flange portion,
    the mating housing includes a mating flange portion, the lever includes a groove portion that extends in a direction of the sliding, when the lever of the connector that is on the fitting position with respect to the mating connector is slid from the second position to the third position, the flange portion and the mating flange portion are accommodated in the groove portion in a manner to be in close contact with each other and thereby are held by the lever, and when the lever of the connector that is on the fitting position with respect to the mating connector is slid from the third position to the second position, holding of the flange portion and the mating, flange portion by the lever is released.

2. The connector device according to claim 1, wherein the lever includes a pair of arm portions sandwiching the housing and the pair of arm portions is attached to the housing, the pair of arm portions having their distal ends and proximal portions respectively;

four pieces of the groove portions are provided at each of the distal ends and each of the proximal portions of the pair of arm portions, respectively, and four pieces of the flange portions are provided to the housing and four pieces of the mating flange portions are provided to the mating housing, the four pieces of the flange portions and the four pieces of the mating flange portions being configured to be accommodated in the four pieces of the groove portions, respectively.

3. The connector device according to claim 1, wherein a cross section orthogonal to the direction of the sliding of each of the flange portion, the mating flange portion, and the groove portion, in a state in which the connector is positioned on the fitting position with respect to the mating connector, has a thickness which increases toward a direction away from the housing and the mating housing in which the flange portion and the mating flange portion protrude.

4. The connector device according to claim 2, wherein a cross section orthogonal to the direction of the sliding of each of the flange portion, the mating flange portion, and the groove portion, in a state in which the connector is positioned on the fitting position with respect to the mating connector, has a thickness which increases toward a direction away from the housing and the mating housing in which the flange portion and the mating flange portion protrude.

5. The connector device according to claim 1, wherein the connector includes an interlock terminal, and the mating connector includes a mating interlock terminal; and wherein when the connector of which the lever is on the first position is on the fitting preparation position with respect to the mating connector, a rotation of the lever to an intermediate position between the first position and the second position causes the connector to move to a main-terminal contact starting position between the fitting preparation position and the fitting position to connect the main terminal and the mating main terminal with each other, when the connector of which the lever is on the intermediate position is on the main-terminal contact starting position with respect to the mating connector, a rotation of the lever to the second position causes the connector to move to the fitting position, connecting the interlock terminal and the mating interlock terminal with each other in a state in which a connection between the main terminal and the mating main terminal is maintained, when the connector of which the lever is on the second position is on the fitting position with respect to the mating connector, a rotation of the lever to the intermediate position causes the connector to move to the main-terminal contact starting position apart from the fining position, wherein a departure of the connector from the fitting position causes a release of a connection between the interlock terminal and the mating interlock terminal in a state in which the connection between the main terminal and the mating main terminal is maintained, and when the connector of which the lever is on the intermediate position is on the main-terminal contact starting position with respect to the mating connector, a rotation of the lever to the first position causes the connector to move to the fitting preparation position, wherein a departure of the connector from the main-terminal contact starting position causes a release of the connection between the main terminal and the mating main terminal.

6. The connector device according to claim 2, wherein the connector includes an interlock terminal, and the mating connector includes z mating interlock terminal; and wherein when the connector of which the lever is on the first position is on the fitting: preparation position with respect to the mating connector, a rotation of the lever to an intermediate position between the first position and the second position causes the connector to move to a main-terminal contact starting position between the fitting preparation position and the fitting position to connect the main terminal and the mating, main terminal with each other, when the connector of which the lever is on the intermediate position is on the main-terminal contact starting position with respect to the mating connector, a rotation of the lever to the second position causes the connector to move to the fitting position, connecting the interlock terminal and the mating interlock terminal with each other in a state in which a connection between the main terminal and the mating main terminal is maintained, when the connector of which the lever is on the second position is on the fitting position with respect to the mating connector, a rotation of the lever to the intermediate position causes the connector to move to the main-terminal contact starting position apart from the fitting position, wherein a departure of the connector from the fitting position causes a release of a connection between the interlock terminal and the mating interlock terminal in a state in which the connection between the main terminal and the mating main terminal is maintained, and when the connector of which the lever is on the intermediate position is on the main-terminal contact starting position with respect to the mating connector, a rotation of the lever to the first position causes the connector to move to the fitting preparation position, wherein a departure of the connector from the main-terminal contact starting position causes a release of the connection between the main terminal and the mating main terminal.

7. The connector device according to claim 3, wherein the connector includes an interlock terminal, and the mating connector includes a mating interlock terminal; and wherein when the connector of which the lever is on the first position is on the fitting preparation position with respect to the mating connector, a rotation of the lever to an intermediate position between the first position and the second position causes the connector to move to a main-terminal contact starting position between the fitting preparation position and the fitting position to connect the main terminal and the mating main terminal with each other, when the connector of which the lever is on the intermediate position is on the main-terminal contact starting position with respect to the mating connector, a rotation of the lever to the second position causes the connector to move to the fitting position, connecting the interlock terminal and the mating interlock terminal with each other in a state in which a connection between the main terminal and the mating main terminal is maintained, when the connector of which the lever is on the second position is on the fitting position with respect to the mating connector, a rotation of the lever to the intermediate position causes the connector to move to the main-terminal contact starting position apart from the fitting position, wherein a departure of the connector from the fitting position causes a release of a connection between the interlock terminal and the mating interlock terminal in a state in which the connection between the main terminal and the mating main terminal is maintained, and when the connector of which the lever is on the intermediate position is on the main-terminal contact starting position with respect to the mating connector, a rotation of the lever to the first position causes the connector to move to the fitting preparation position, wherein a departure of the connector from the main-terminal contact starting position causes a release of the connection between the main terminal and the mating main terminal.

8. The connector device according to claim 4, wherein the connector includes an interlock terminal, and the mating connector includes a mating interlock terminal; and wherein when the connector of which the lever is on the first position is on the fitting preparation position with respect to the mating connector, a rotation of the lever to an intermediate position between the first position and the second position causes the connector to move to a main-terminal contact starting position between the fitting preparation position and the fitting position to connect the main terminal and the mating main terminal with each other, when the connector of which the lever is on the intermediate position is on the main-terminal contact starting position with respect to the mating connector, a rotation of the lever to the second position causes the connector to move to the fitting position, connecting the interlock terminal and the mating interlock terminal with each other in a state in which a connection between the main terminal and the mating main terminal is maintained, when the connector of which the lever is on the second position is on the fitting position with respect to the mating connector, a rotation of the lever to the intermediate position causes the connector to move to the main-terminal contact starting position apart from the fitting position, wherein a departure of the connector from the fitting position causes a release of a connection between the interlock terminal and the mating interlock terminal in a state in which the connection between the main terminal and the mating main terminal is maintained, and when the connector of which the lever is on the intermediate position is on the main-terminal contact starting position with respect to the mating connector, a rotation of the lever to the first position causes the connector to move to the fitting preparation position, wherein a departure of the connector from the main-terminal contact starting position causes a release of the connection between the main terminal and the mating main terminal.

9. The connector device according to claim 1, wherein the connector includes an interlock housing and an interlock terminal, the mating connector includes a mating interlock terminal, the interlock terminal is attached to the interlock housing, the interlock housing is formed with a spring piece, the spring piece having a protrusion portion on an end thereof, the protrusion portion protruding outward of the interlock housing, such that the protrusion portion is displaced from a natural position to a retracted position when the protrusion portion is pressed, the lever is provided with a pressing portion, the housing is provided with an abutting surface, and the interlock housing is attached to the housing so that the interlock housing is capable of sliding between an opening position and a closing position, the opening position and the closing position being positions for the interlock housing to take, wherein the interlock housing on the opening position is blocked from sliding to the closing position by an abutment of the protrusion position on the abutting surface when the protrusion portion is on the natural position, and is permitted to slide to the closing position when the protrusion portion is on the retracted position; and wherein when the connector is on the fitting position with respect to the mating connector and the interlock housing is on the opening position, the interlock terminal and the mating interlock terminal are mutually disconnected, when the connector is on the fitting position with respect to the mating connector and the interlock housing is on the closing position, the interlock terminal and the mating interlock terminal are mutually connected, when the connector is on the fitting position with respect to the mating connector and the lever is on the second position, the protrusion portion is on the natural position, and when the connector is on the fitting position with respect to the mating connector and the lever is on the third position, the protrusion portion is pressed by the pressing portion of the lever to be positioned on the retracted position.

10. The connector device according to claim 2, wherein the connector includes an interlock housing and an interlock terminal, the mating connector includes a mating interlock terminal, the interlock terminal is attached to the interlock housing, the interlock housing is formed with a spring piece, the spring piece having a protrusion portion on an end thereof, the protrusion portion protruding outward of the interlock housing, such that the protrusion portion is displaced from a natural position to a retracted position when the protrusion portion is pressed, the lever is provided with a pressing portion, the housing is provided with an abutting surface, and the interlock housing is attached to the housing so that the interlock housing is capable of sliding between an opening position and a closing position, the opening position and the closing position being positions for the interlock housing to take, wherein the interlock housing on the opening position is blocked from sliding to the closing position by an abutment of the protrusion position on the abutting surface when the protrusion portion is on the natural position, and is permitted to slide to the closing position when the protrusion portion is on the retracted position; and wherein when the connector is on the fitting position with respect to the mating connector and the interlock housing is on the opening position, the interlock terminal and the mating interlock terminal are mutually disconnected, when the connector is on the fitting position with respect to the mating connector and the interlock housing is on the closing position, the interlock terminal and the mating interlock terminal are mutually connected, when the connector is on the fitting position with respect to the mating connector and the lever is on the second position, the protrusion portion is on the natural position, and when the connector is on the fitting position with respect to the mating connector and the lever is on the third position, the protrusion portion is pressed by the pressing portion of the lever to be positioned on the retracted position.

11. The connector device according to claim 3, wherein the connector includes an interlock housing and an interlock terminal, the mating connector includes a mating interlock terminal, the interlock terminal is attached to the interlock housing, the interlock housing is formed with a spring piece, the spring piece having a protrusion portion on an end thereof, the protrusion portion protruding outward of the interlock housing, such that the protrusion portion is displaced from a natural position to a retracted position when the protrusion portion is pressed, the lever is provided with a pressing portion, the housing is provided with an abutting surface, and the interlock housing is attached to the housing so that the interlock housing is capable of sliding between an opening position and a closing position, the opening position and the closing position being positions for the interlock housing to take, wherein the interlock housing on the opening position is blocked from sliding to the closing position by an abutment of the protrusion position on the abutting surface when the protrusion portion is on the natural position, and is permitted to slide to the closing position when the protrusion portion is on the retracted position; and wherein when the connector is on the fitting position with respect to the mating connector and the interlock housing is on the opening position, the interlock terminal and the mating interlock terminal are mutually disconnected, when the connector is on the fitting, position with respect to the mating connector and the interlock housing is on the closing position, the interlock terminal and the mating interlock terminal are mutually connected, when the connector is on the fitting position with respect to the mating connector and the lever is on the second position, the protrusion portion is on the natural position, and when the connector is on the fitting position with respect to the mating connector and the lever is on the third position, the protrusion portion is pressed by the pressing portion of the lever to be positioned on the retracted position.

12. The connector device according to claim 4, wherein the connector includes an interlock housing and an interlock terminal, the mating connector includes a mating interlock terminal, the interlock terminal is attached to the interlock housing, the interlock housing is formed with a spring piece, the spring piece having a protrusion portion on an end thereof, the protrusion portion protruding outward of the interlock housing, such that the protrusion portion is displaced from a natural position to a retracted position when the protrusion portion is pressed, the lever is provided with a pressing portion, the housing is provided with an abutting surface, and the interlock housing is attached to the housing so that the interlock housing is capable of sliding between an opening position and a closing position, the opening position and the closing position being positions for the interlock housing to take, wherein the interlock housing on the opening position is blocked from sliding to the closing position by an abutment of the protrusion position on the abutting surface when the protrusion portion is on the natural position, and is permitted to slide to the closing position when the protrusion portion is on the retracted position; and wherein when the connector is on the fitting position with respect to the mating connector and the interlock housing is on the opening position, the interlock terminal and the mating interlock terminal are mutually disconnected, when the connector is on the fitting position with respect to the mating connector and the interlock housing is on the closing position, the interlock terminal and the mating interlock terminal are mutually connected, when the connector is on the fitting position with respect to the mating connector and the lever is on the second position, the protrusion portion is on the natural position, and when the connector is on the fitting position with respect to the mating connector and the lever is on the third position, the protrusion portion is pressed by the pressing portion of the lever to be positioned on the retracted position.

* * * * *

UNITED STATES PATENT AND TRADEMARK OFFICE
CERTIFICATE OF CORRECTION

PATENT NO. : 12,176,652 B2
APPLICATION NO. : 17/890530
DATED : December 24, 2024
INVENTOR(S) : Takeshi Takahashi et al.

Page 1 of 4

It is certified that error appears in the above-identified patent and that said Letters Patent is hereby corrected as shown below:

In the Specification

Column 1, Line 26, "a pair of arm plate portions 12a and 12h" should be changed to --a pair of arm plate portions 12a and 12b--.

Column 1, Line 56, "the connector housing 2:1" should be changed to --the connector housing 21--.

Figure 3A:
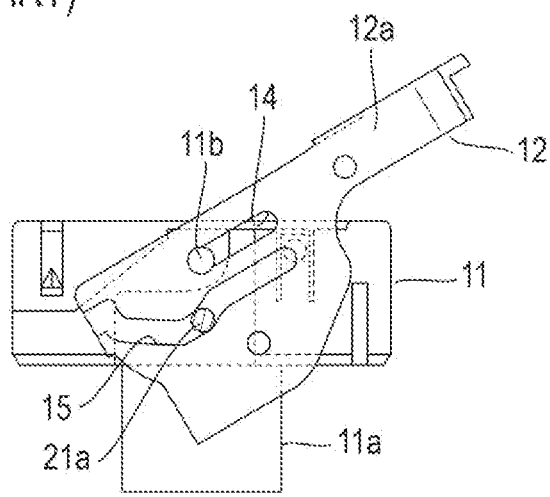
FIG. 3A is an elevational view illustrating a state in which the lever is positioned between a rotation starting position and a rotation completion position.
Figure 3B:
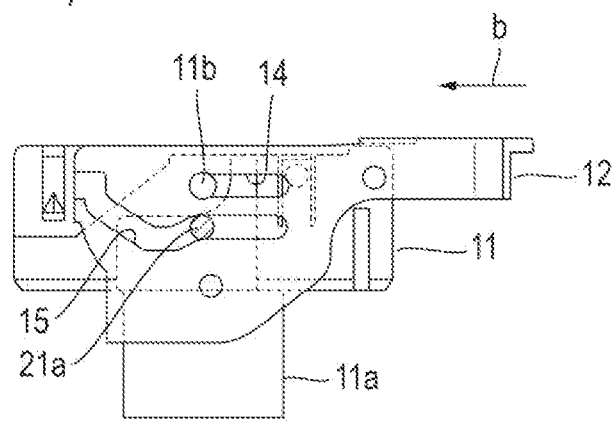
FIG. 3B is an elevational view illustrating a state in which the lever is positioned on the rotation completion position.
Figure 3C:
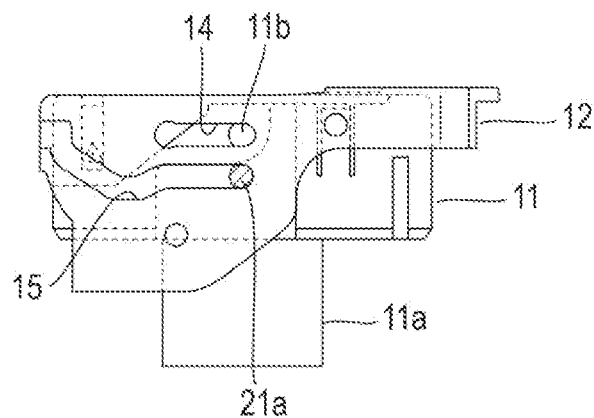
FIG. 3C is an elevational view illustrating a state in which the lever is positioned on a fitting completion position.
Figure 4A:
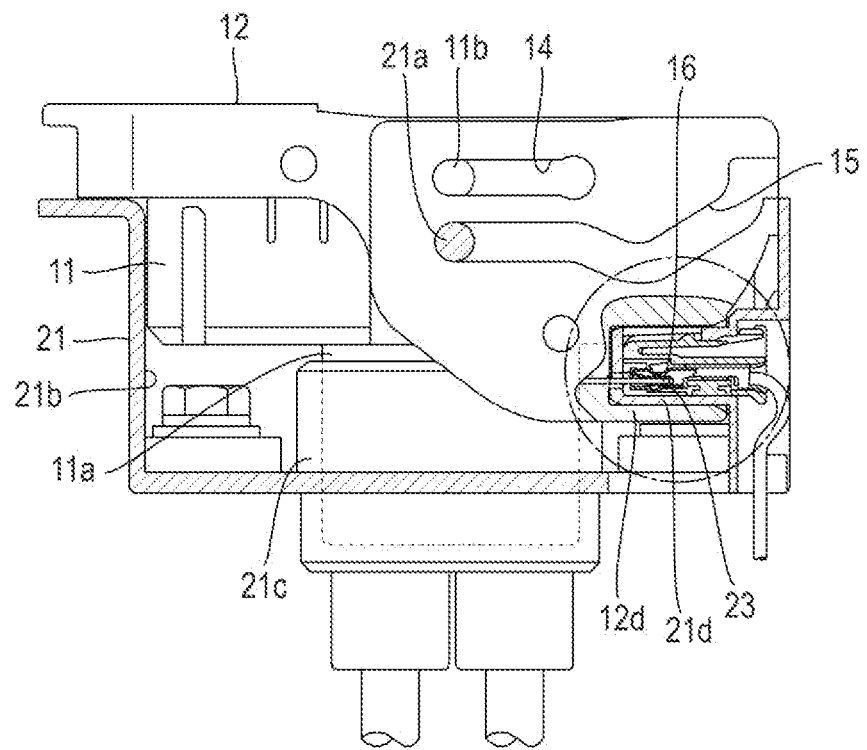
FIG. 4A is a partial sectional view illustrating a mounting completion state of the connector device illustrated in FIG. 1.
Figure 4B:
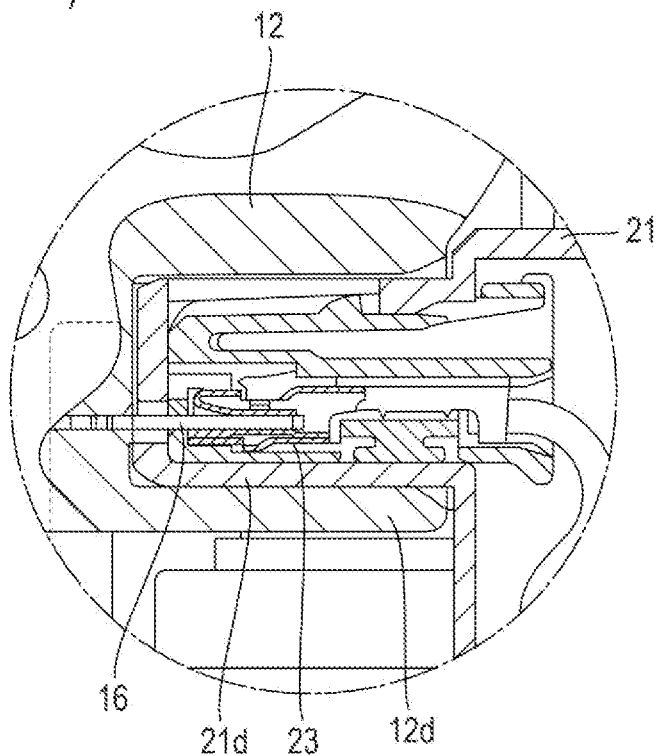
FIG. 4B is an enlarged view illustrating principal portions of FIG. 4A.

Column 2, Line 6, "Further. FIG. 3C" should be changed to --Further, FIG. 3C--.

Column 2, Line 19, "h direction from" should be changed to --b direction from--.

Column 2, Line 20, "the fining detection" should be changed to --the fitting detection--.

Column 2, Line 51, "a connector device fOr high voltage" should be changed to --a connector device for high voltage--.

Column 4, Line 25, "the lever of FIG. 1," should be changed to --the lever of FIG. 1.--.

Figure 10:
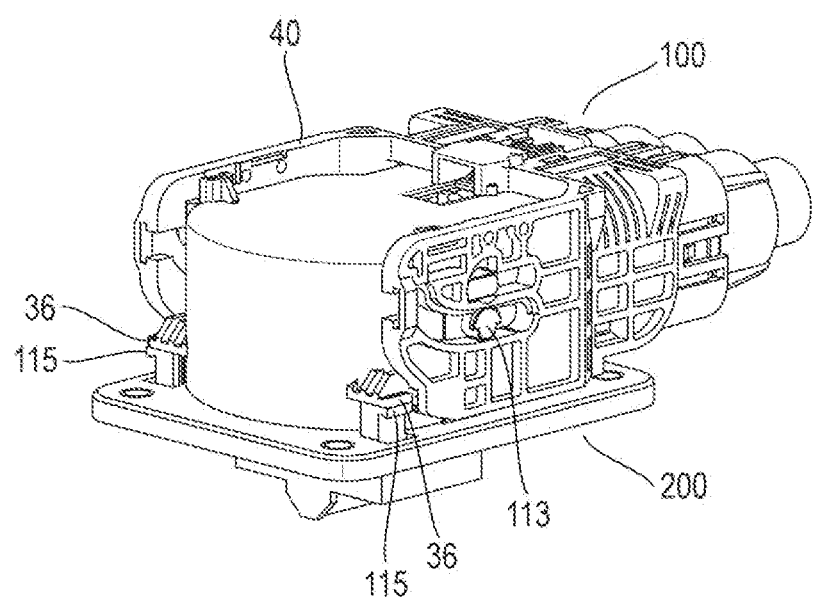
FIG. 10 is a perspective view illustrating a state in which the lever is rotated to a second position from the state illustrated in FIG. 9.
Figure 11:
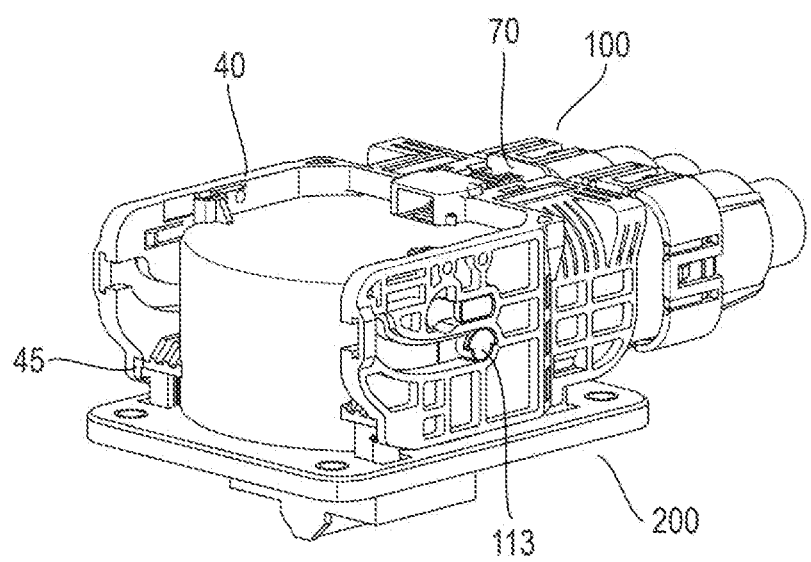
FIG. 11 is a perspective view illustrating a state in which the lever is slid to a third position from the state illustrated in FIG. 10.

Column 5, Line 25, "illustrated in FIG. 10," should be changed to --illustrated in FIG. 10.--.

Column 5, Line 43, "a rating flange portion" should be changed to --a mating flange portion--.

Column 5, Line 53, "an devotional view" should be changed to --an elevational view--.

Column 5, Line 57, "illustrated in FIG. 21A," should be changed to --illustrated in FIG. 21A.--.

Figure 2A:
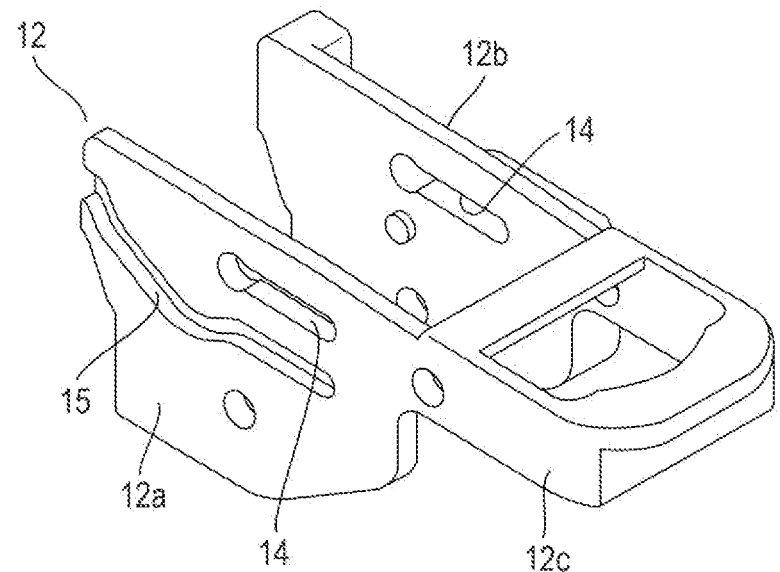
FIG. 2A is a perspective view of a lever of FIG. 1.
Figure 2B:
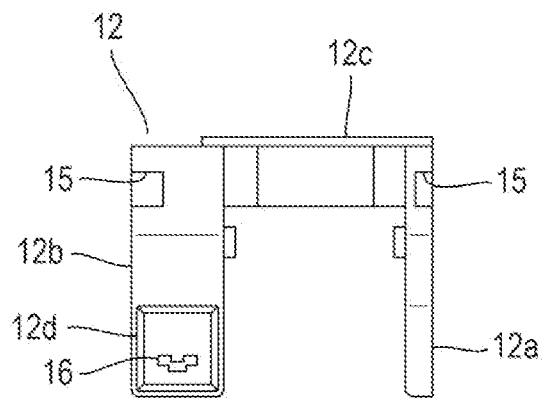
FIG. 2B is a lateral view of the lever of FIG. 1.

Column 5, Line 59, "illustrated in FIG. 2 IA." should be changed to --illustrated in FIG. 21A.--.

Figure 22A:
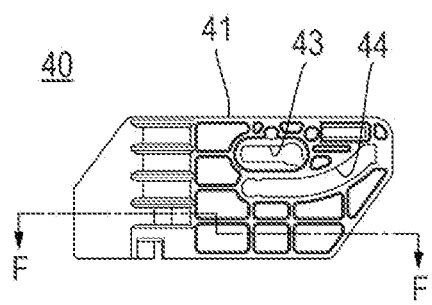
FIG. 22A is a lateral view of a lever of FIG. 20A.
Figure 22B:
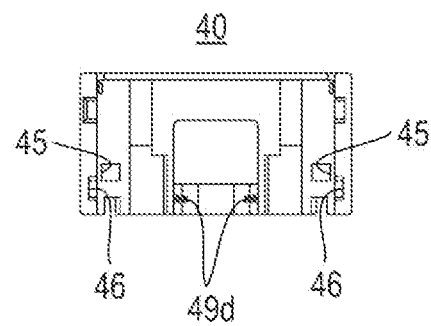
FIG. 22B is a rear view of the lever of FIG. 20A.
Figure 22C:
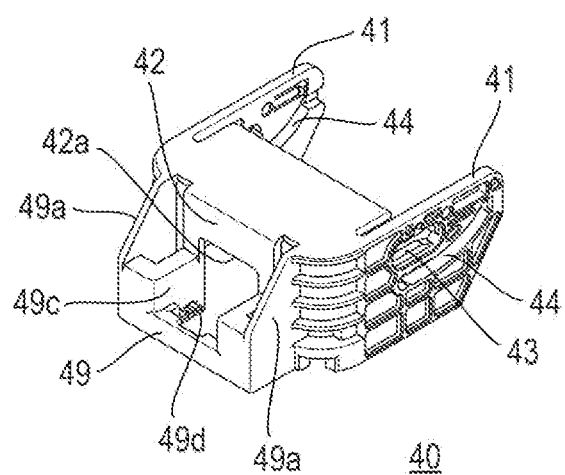
FIG. 22C is a perspective view of the lever of FIG. 20A viewed from an upper front side.
Figure 22D:
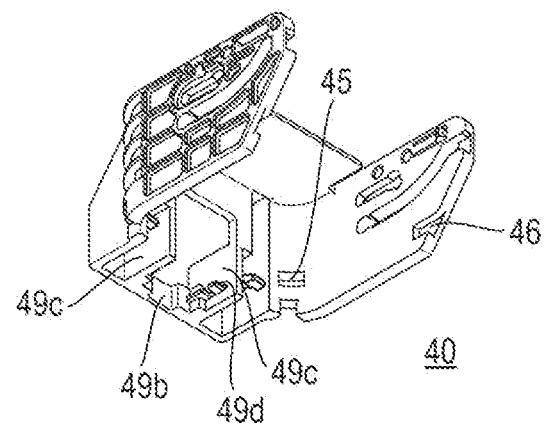
FIG. 22D is a perspective view of the lever of FIG. 20A viewed from a lower rear side.
Figure 22E:
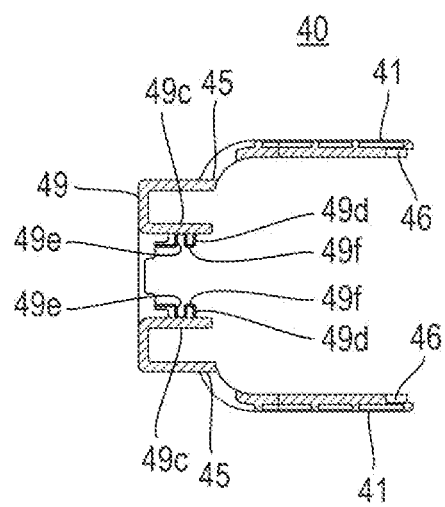
FIG. 22F is a sectional view taken along the F-F line of FIG. 22A.

Column 5, Line 66, "FIG. 22F is a sectional view" should be changed to --FIG. 22E is a sectional view--.

Signed and Sealed this
Sixteenth Day of September, 2025

Coke Morgan Stewart
*Acting Director of the United States Patent and Trademark Office*

Column 6, Line 1, "illustrating, a state" should be changed to --illustrating a state--.

Column 6, Line 2, "illustrated in Ha 20A" should be changed to --illustrated in FIG. 20A--.

Column 6, Line 17, "FIG. 26k." should be changed to --FIG. 26A.--.

Column 7, Line 33, "circumferential all" should be changed to --circumferential wall--.

Column 7, Line 36, "mating flange portion." should be changed to --mating flange portion--.

Column 7, Line 37, "mating flange portion." should be changed to --mating flange portion--.

Column 7, Line 57, "Ms. 6A to 6C" should be changed to --FIGS. 6A to 6C--.

Column 8, Line 26, "the fitting portion 311" should be changed to --the fitting portion 31--.

Column 8, Line 57, "the arm portion 4:1" should be changed to --the arm portion 41--.

Column 9, Line 5, "and SB illustrate" should be changed to --and 5B illustrate--.

Column 9, Line 7, "FIGS. 6A, 613, and 6C" should be changed to --FIGS. 6A, 6B, and 6C--.

Column 9, Line 22, "front rear direction" should be changed to --front-rear direction--.

Column 9, Line 42, "mutually outward m" should be changed to --mutually outward in--.

Column 9, Line 54, "FIGS. 16A to 16C. FIGS. 17A to 17C" should be changed to --FIGS. 16A to 16C, FIGS. 17A to 17C--.

Column 9, Line 63, "The driven bosses 1113" should be changed to --The driven bosses 113--.

Column 10, Line 3, "State 2: Ms. 14A" should be changed to --State 2: FIGS. 14A--.

Column 10, Line 28, "State 3: FIGS. 10, 15A, 1513, 15C, 016A, 16B, and 16C" should be changed to --State 3: FIGS. 10, 15A, 15B, 15C, 16A, 16B, and 16C--.

Column 10, Line 60, "State 4: FIGS. 11, 17A, 1713, and 17C" should be changed to --State 4: FIGS. 11, 17A, 17B, and 17C--.

Column 10, Line 64, "the mating flange portions 115 and 11" should be changed to --the mating flange portions 115 and 116--.

Column 11, Line 17, "as illustrated in FIG. 171" should be changed to --as illustrated in FIG. 17B--.

Column 11, Line 21, "State 5: FIGS. 12,18A, and 18B" should be changed to --State 5: FIGS. 12, 18A, and 18B--.

Column 12, Line 29, "illustrated in FIGS. 199" should be changed to --illustrated in FIGS. 19B--.

Column 12, Line 31, "FIG. 199 illustrates" should be changed to --FIG. 19B illustrates--.

Column 12, Line 40, "illustrated in FIG. 199" should be changed to --illustrated in FIG. 19B--.

Column 12, Line 63, "the lever 400 of the connector 400" should be changed to --the lever 40 of the connector 400--.

Column 13, Line 11, "3:1 and the" should be changed to --31 and the--.

Column 13, Line 13, "The attaching, portion 39" should be changed to --The attaching portion 39--.

Column 13, Line 22, "in Fits. 22A" should be changed to --in FIGS. 22A--.

Column 13, Line 26, "coupling portion. 42" should be changed to --coupling portion 42--.

Column 13, Line 35, "the cam groove 11" should be changed to --the cam groove 44--.

Column 13, Line 43, "an opening 49h" should be changed to --an opening 49b--.

Column 14, Line 25, "states A to a FIG. 23" should be changed to --states A to D. FIG. 23--.

Column 14, Line 37, "the fitted portion 1:12" should be changed to --the fitted portion 112--.

Column 14, Line 53, "the protrusion portion. 93a" should be changed to --the protrusion portion 93a--.

Column 15, Line 22, "FIGS. 221, 22B" should be changed to --FIGS. 22A, 22B--.

Column 15, Line 39, "flange portions 115 and 1116" should be changed to --flange portions 115 and 116--.

Column 15, Line 41, "State D; FIGS. 24 and 28B" should be changed to --State D: FIGS. 24 and 28B--.

In the Claims

Column 17, Line 13 (Claim 1, Line 50), "the mating, flange portion" should be changed to --the mating flange portion--.

Column 17, Line 19 (Claim 2, Line 5), "proximal portions respectively;" should be changed to --proximal portions respectively,--.

Column 18, Line 6 (Claim 5, Line 27), "fining position" should be changed to --fitting position--.

CERTIFICATE OF CORRECTION (continued)
U.S. Pat. No. 12,176,652 B2

Column 18, Line 23 (Claim 6, Line 3), "includes z mating interlock terminal" should be changed to --includes a mating interlock terminal--.

Column 18, Line 32 (Claim 6, Line 12), "the mating, main terminal" should be changed to --the mating main terminal--.

Column 20, Line 5 (Claim 8, Line 37), "the fining preparation position" should be changed to --the fitting preparation position--.

Column 22, Line 1 (Claim 11, Line 30), "the fitting, position" should be changed to --the fitting position--.